United States Patent
Bashan et al.

[11] Patent Number: 6,161,762
[45] Date of Patent: Dec. 19, 2000

[54] CONTACT/CONTACTLESS SMART CARD HAVING CUSTOMIZABLE ANTENNA INTERFACE

[75] Inventors: Oded Bashan, Carmiel; Nehemya Itay, Kfar Giladi; Ronnie Gilboa, Beit Hillel; Moshe Aduk, Korazim, all of Israel

[73] Assignee: On Track Innovations Ltd., Rosh Pina, Israel

[21] Appl. No.: 09/221,160

[22] Filed: Dec. 28, 1998

[30] Foreign Application Priority Data

Dec. 31, 1997 [IL] Israel ........................................ 122841

[51] Int. Cl.$^7$ ........................................................ G06K 19/06
[52] U.S. Cl. ........................ 235/492; 235/380; 340/825.54
[58] Field of Search ............................................ 235/492, 375, 235/385, 451, 380, 472.02, 487; 340/825.34, 825.54

[56] References Cited

U.S. PATENT DOCUMENTS

| | | |
|---|---|---|
| 5,241,160 | 8/1993 | Bashan et al. . |
| 5,260,701 | 11/1993 | Guern et al. .......................... 340/825.54 |
| 5,418,358 | 5/1995 | Bruhnke et al. ........................... 235/380 |
| 5,521,590 | 5/1996 | Hanaoka et al. ..................... 340/825.54 |
| 5,889,273 | 3/1999 | Goto ........................................ 235/492 |
| 6,000,606 | 12/1999 | Dethloff .................................... 235/375 |
| 6,010,074 | 1/2000 | Kelly et al. ............................... 235/492 |
| 6,010,075 | 1/2000 | Ishifuji et al. ............................ 235/492 |
| 6,036,100 | 3/2000 | Asami ...................................... 235/492 |

FOREIGN PATENT DOCUMENTS

| | | |
|---|---|---|
| 0453314 | 10/1991 | European Pat. Off. . |
| 39 35 364 | 8/1990 | Germany . |
| 404-064-189 | 2/1992 | Japan . |
| 2279613 | 1/1995 | United Kingdom . |
| 9638814 | 12/1996 | WIPO . |
| 9749076 | 12/1997 | WIPO . |

*Primary Examiner*—Michael G Lee
*Attorney, Agent, or Firm*—Browdy and Neimark

[57] ABSTRACT

A data transaction device having a contactless mode of operation and comprising an antenna coil coupled to a processing unit via an antenna interface for allowing contactless data transmission between the data transaction device and a remote transceiver. A circuit within the antenna interface includes a modulator for modulating a signal transmitted by the remote transceiver and received by the antenna coil with outgoing data generated by the processing unit for transmitting via the antenna coil to the remote transceiver. The circuit further includes a variable loading circuit connected in series with a load seen by the antenna coil and having a capacitance connected across the load so as to effect a change in impedance of the load seen by the antenna coil thus allowing amplitude and/or phase modulation of said signal without complete interruption thereof and regardless of the magnitude of an external capacitance connected across the load. Preferably, the antenna interface may be customized for different applications and the data transaction device also includes a contact field thus allowing for either contact or contactless communication.

25 Claims, 14 Drawing Sheets

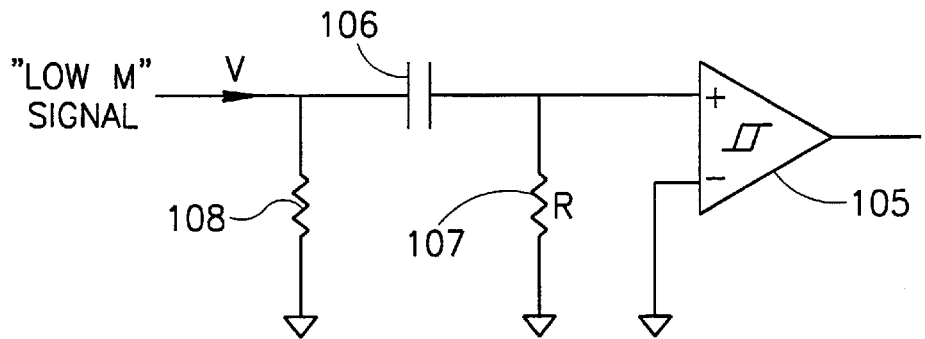
FIG.8A
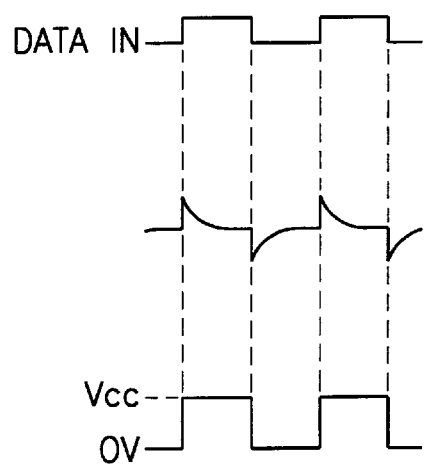
FIG.8B
FIG.8C
FIG.8D
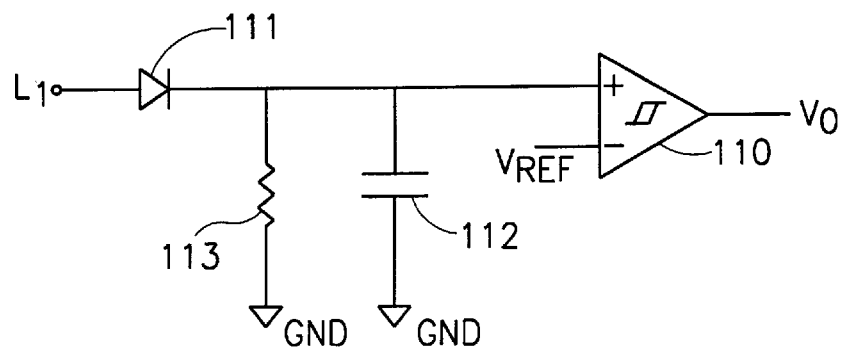
FIG.9A

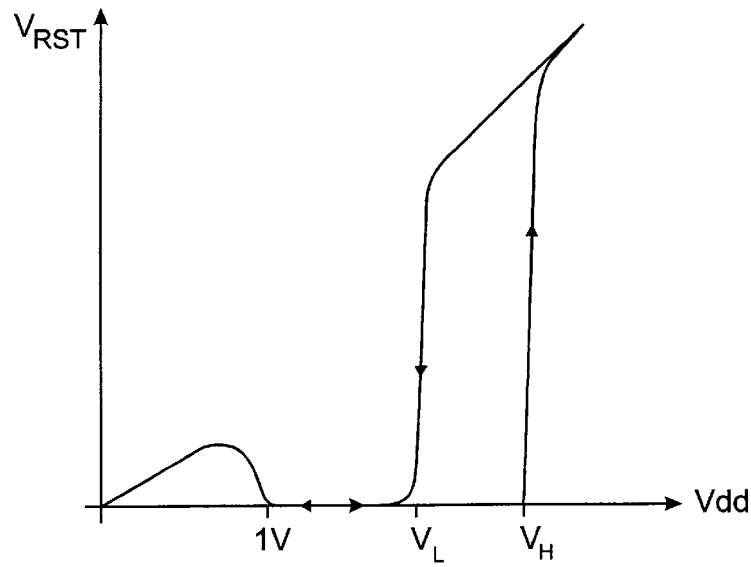

Fig. 11

| MICROPROCESSOR | | ANTENNA INTERFACE | |
|---|---|---|---|
| CONTACT MODE | CONTACTLESS MODE | CONTACT MODE | CONTACTLESS MODE |
| Vdd = ⎍<br>RST = ⎍<br>CLK = ⎍⎍⎍⎍<br>IO$_2$ = 0 ⇒ C.M<br>DATA via IO$_1$<br>C.M { data trans-<br>action<br>ISO 7816 | Vdd = ╱<br>RST = ⎍<br>CLK = ⎍⎍⎍⎍<br>IO$_2$ = 1 ⇒ C/L<br>DATA via IO$_2$<br>C/L { data trans-<br>action<br>CONTACTLESS PROTOCOLS | Vdd = ⎍<br>RST, CLK = TRISTATE<br>E/M FIELD OFF ⇒ C.M. MODE | Vdd = ╱<br>RST = ⎍<br>CLK = ⎍⎍⎍⎍<br>E/M FIELD ON ⇒ C/L. MODE<br>DATA TRANS-ACTION via IO$_2$ |

Fig. 12

CONTACT/CONTACTLESS SMART CARD HAVING CUSTOMIZABLE ANTENNA INTERFACE

FIELD OF THE INVENTION

The invention relates to a data transaction card having an on-board processor for effecting both "contact" and "contactless" modes of data transfer.

BACKGROUND OF THE INVENTION

Both "contact" and "contactless" smart cards are known per se. Generally, such smart cards are provided either with electrical contacts for effecting direct electrical contact with a card reader; or else they are provided with an antenna coil for effecting contactless bi-directional communication with a remote card reader. U.S. Pat. No. 5,206,495 for a Chip Card in the name of H. D. Kreft discloses a chip card allowing both contact and contactless communication in a single smart card.

Contactless smart cards are particularly suited for applications, such as mass transport systems, wherein data communication must be effected very quickly without imposing the overhead incurred in manually introducing the smart card into the slot of a card reader.

U.S. Pat. No. 5,206,495 has as a principal object thereof the provision of a contact/contactless chip card having a semiconductor device selectively coupled either to a contact field or to a antenna coil. A further declared feature is that the semiconductor device operates according to contact mode protocol (ISO Standard 7816) regardless of the mode of data transfer, such that the semiconductor device perceives no difference between contact and contact-free use of the chip card.

Such chip cards employ an on-board semiconductor device including memory and processing capability for effecting the desired bi-directional data transmission and data storage. In the case where "contact" data transmission is required, there is provided a so-called "contact field" having a plurality of contacts, each of which is selectably connected to the semiconductor device by means of a respective electrical connection. Data transmission with an external reader is then effected by inserting the card into a suitable reader having spring-loaded contacts which bear on respective contacts in the contact field of the chip card.

Alternatively, when contactless data transmission is required, a pair of antenna coils in the chip card are adapted to transfer power to the card and to enable bi-directional data communication with a reading device having a similar antenna.

The interconnection provided by U.S. Pat. No. 5,206,495 allows for a semiconductor device conforming to ISO Standard 7816 for "contact" bi-directional data transmission also to be used for "contactless" type data transmission without in any way modifying the semiconductor device. On the other hand, such an approach exacts a price in the efficiency of data transfer owing to the inherent differences between efficient contactless data protocols and the ISO 7816 contact protocol, which thus requires that the card include a data conversion facility if the semiconductor device is to perceive the same protocol in both contact and contactless modes. The use of two coils is also considered a retrograde step reminiscent of the early U.S. Pat. No. 3,299,424 (Vinding) wherein multiple coils were employed: a trend which has long been abandoned in favor of the use of a single coil only.

International Patent Publication No. WO 96/38814 (Mikron) discloses an arrangement functionally similar to that shown in U.S. Pat. No. 5,206,495 in that contact and contactless data and control lines are switchably connected to a processing unit shown as 13d. To this end there are provided separate CLOCK, DATA and RESET lines in both the contactless and contact interfaces 13b and 13c, respectively, which are connected via a switching element shown as 13a.

Yet a further consideration associated with the increasing use of smart cards is the need to customize each smart card for the particular application for which it is destined. Obviously, the provision of both contact and contactless modes of data transfer increases the card's versatility since the actual mode of data transfer may then be selected according to user requirements. However, in practice, there are many other features associated with smart cards which also must be optimized for each specific application, be it contactless access control or mass transportation or contact mode bank applications and so on.

Such versatility is addressed by our co-pending WO 98/29830 filed on Dec. 29, 1997 which discloses a data transaction card having contact and contactless modes of operation, comprising a semiconductor device for operating in contact and contactless modes in accordance with a respective contact or contactless data communications protocol. A contact field includes contacts fixedly connected to the semiconductor device for allowing data transmission between the contacts and the semiconductor device in accordance with the contact data communications protocol, whilst an antenna coil allows contactless data transmission between the antenna coil and the semiconductor device, in accordance with the contactless data communications protocol. An antenna interface is coupled to the antenna coil, to the semiconductor device and to at least some of the contacts in the contact field and is responsive to an electromagnetic field across the antenna coil for effecting the contactless data transmission.

Preferably, in such an arrangement, the contactless data communications protocol is in accordance with ISO 14443 which also sets a low amplitude modulation for data transmission both from the reader to the card as well as from the card to the reader. This modulation limit is designed to prevent the amplitude of the high frequency carrier falling to a level which could cause interruption of the energy transfer via the modulated carrier wave between the reader and the card which has no separate energy source of its own. It also reduces sidebands and therefore allows a relative increase in the intensity, or signal strength, of the fundamental center frequency, thereby increasing the operating range of the application. ISO 14443 also caters for 100% amplitude modulation when transmitting data from the reader to the card. The resultant interruption of energy transfer to the card must be allowed for.

U.S. Pat. No. 5,241,160 assigned to the present applicants discloses a bi-directional contactless data transaction card wherein the reader has a matched antenna circuit allowing the tuned frequency thereof to be maintained regardless of any changes in the length of cable connecting the antenna thereto. According to a preferred data communications protocol, data is transferred from the reader to the card by using a specially adapted 100% amplitude modulation, pulse width encoded signal, responsive to data bits of a defined logic level. As a result, energy transfer to the card is momentarily interrupted. During, this brief time interval, the logic functions of the card are sustained via a capacitor which is charged during the period of time that energy is transferred from the reader to the card. Data is transferred from the card to the reader by decoupling, the tuned antenna circuit in the card. Such a decoupling technique results in a significant increase in the signal level of the reader antenna than is achieved by any other loading scheme. It also causes interruption of power transfer to the card via the carrier signal, during which power is maintained via the capacitor. These advantages notwithstanding, decoupling the card antenna does not conform to the prevalent ISO 14443 standard.

There are clearly advantages to be gained in providing a data transaction card which allows for carrier wave modulation to be performed both according to ISO 14443 as well as to our own proprietary protocol. This would allow more efficient manufacture with reduced stocks resulting in a single card offering upward compatibility for existing users whilst also supporting the ISO 14443 protocol.

It would therefore be a significant improvement if there were provided a data transaction card having a contactless interface allowing low or 100% amplitude modulation of the reader carrier signal for reader to card data transfer and also allowing for either decoupling or partial loading of the tuned antenna circuit therein for card to reader data transfer, so as to allow for compatibility with all applications and also to offer greater versatility to those end users who will thus be free to choose whichever protocol better suits their needs.

SUMMARY OF THE INVENTION

It is a principal object of the invention to provide a data transaction card having a contactless mode of operation selectably operating in accordance with different communications protocols.

It is a further object of the invention, to provide such a data transaction card wherein operating parameters associated with the communications protocols can be set by the manufacturer or user in accordance with customer requirements.

In accordance with a broad aspect of the invention there is provided a data transaction device having a contactless mode of operation and comprising:

an antenna coil coupled to a processing unit via an antenna interface for allowing contactless data transmission between the data transaction card and a remote transceiver, and a circuit within the antenna interface including a variable loading means for modulating a signal transmitted by the remote transceiver and received by said antenna coil with outgoing data generated by the processing unit for transmitting via the antenna coil to the remote transceiver, wherein said circuit includes:

the variable loading means being connected in series with a load seen by the antenna coil and having a capacitance connected across said load so as to effect a change in impedance of the load seen by the antenna coil thus allowing amplitude and/or phase modulation of said signal without complete interruption thereof and regardless of the magnitude of the capacitance connected across or forming part of said load.

Preferably, the antenna interface includes a bi-directional communications interface including a demodulator for amplitude demodulating an electromagnetic field across the antenna coil so that the electromagnetic field functions as a modulated carrier wave allowing the data to be extracted therefrom using amplitude modulation having a low modulation index and regardless of the magnitude of any capacitance connected across the load. The variable loading means may include a resistor or a non-linear element having connected thereacross a switch. Modulation is achieved by closing and opening the switch as a function of the outgoing data, whereby the impedance of the variable loading means varies from zero to the resistance of the resistor or the impedance of the non-linear element.

A contact mode may also be provided wherein data is fed serially via contacts in a contact field. Preferably, the processing unit is a microprocessor having suitable input/output (i/o) ports and data is fed thereto in contact and contactless modes by different i/o ports. This enables the contacts in the contact field to be fixedly connected to the microprocessor, data being selected, by default, from the antenna coil if an electromagnetic field is detected across the antenna coil by the demodulator in the antenna interface; and data being selected from the contact field otherwise.

The processing unit and the antenna interface may, if desired, be integrated on a single chip.

BRIEF DESCRIPTION OF THE DRAWINGS

In order to understand the invention and to see how the same may be carried out in practice, a preferred embodiment will now be described, by way of a non-limiting example only, with reference to the accompanying drawings, in which:

FIG. 4b shows graphically a voltage/current characteristic of a non-linear element for use in the variable loading means depicted in FIG. 4a;

FIG. 5b shows graphically a series of controllable voltage/current characteristics of the non-linear element for use in the variable loading means depicted in FIG. 5a;

FIG. 6b is a circuit diagram of the shunt regulator shown functionally in FIG. 6a;

FIG. 8a shows schematically a demodulator for demodulating a "LOW M" modulated signal;

FIGS. 8b, 8c and 8d show, respectively, graphical waveforms of the incoming signal fed to the demodulator input, a differentiated incoming signal and the signal appearing at the output of the demodulator shown in FIG. 8a;

FIG. 9a shows schematically a demodulator for demodulating a "HIGH M" modulated signal;

FIGS. 9b and 9c show graphically input and output voltage waveforms associated with the demodulator illustrated in FIG. 9a;

FIG. 11 shows the effect of hysteresis on the reset voltage, RST;

FIG. 12 is a table comparing control signals and data flow in the microprocessor and the antenna interface for contact and contactless mode, respectively;

DETAILED DESCRIPTION OF A PREFERRED EMBODIMENT

Figure 1A:
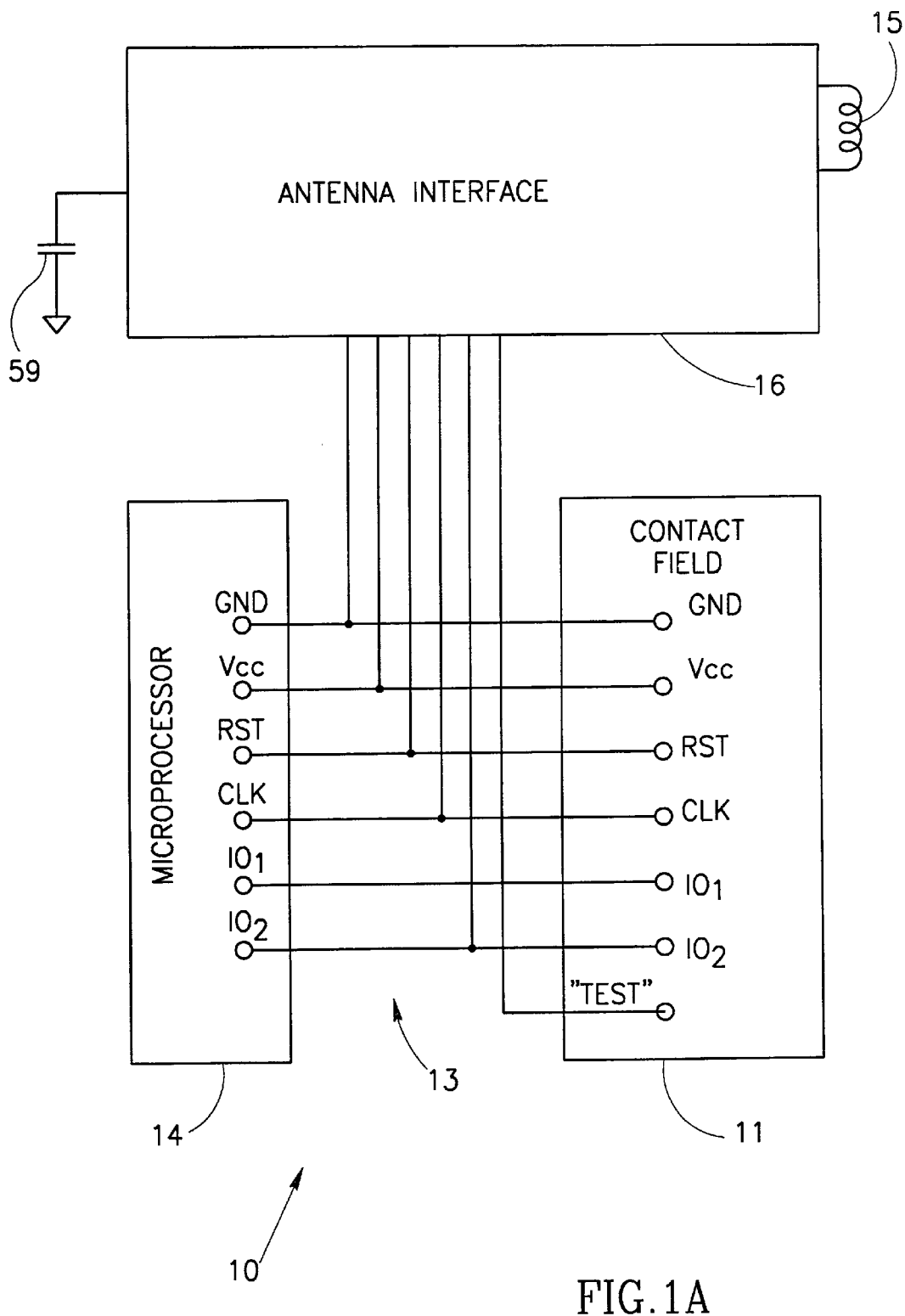
FIGS. 1a, 1b and 1c show functionally a data transaction card according to the invention having an antenna interface.

FIG. 1a shows the structural interconnection of a data transaction card 10 according to the invention and having both "contact" and "contactless" modes of bi-directional data transmission. There is provided a contact field 11 having a plurality of contacts each of which is connected by a separate line 13 to a microprocessor 14. Associated with the microprocessor 14 are processing and memory capability as is known in smart cards and described, for example, in our U.S. Pat. No. 5,241,160 the contents of which are incorporated herein by reference. Typically, six or eight contacts are provided of which five are typically active as standard in the contact field 11 and each of these is connected by a separate line 13 to the microprocessor 14. As shown, the contact field 11 has contacts labeled "GND", "Vcc", "RST", "CLK", "$IO_1$", "$IO_2$" and "TEST". The contact Vcc is connected to the voltage supply input Vcc of the microprocessor 14 which has a pair of i/o ports $IO_1$ and $IO_2$ connected to the corresponding contacts in the contact field 11. The microprocessor 14 also has a reset terminal RST connected to the contact "RST" in the contact field 11; and a clock terminal, CLK connected to the contact "CLK" in the contact field 11. The microprocessor 14 also has a ground terminal, GND connected to the contact "GND" of the contact field.

Non-contact bi-directional data transmission is effected by a antenna coil 15 which is connected to four of the lines 13 (CLK, RST, Vcc and GND) via an antenna interface 16 and which allow for specific features of the microprocessor 14 to be controlled. Data itself is transmitted serially via a fifth line $IO_2$ from the antenna interface 16 to the microprocessor 14. The antenna interface 16 has a pair of coil connection terminals 20 and 21 for connecting the antenna coil 15 thereto and a voltage supply terminal 22 for connecting to the voltage supply input Vcc of the microprocessor 14 in parallel with the contact "Vcc" in the contact field 11. A ground terminal, GND allows connection of the antenna interface 16 to the GND terminal of the microprocessor 14 in parallel with the ground contact "GND" in the contact field 11. The "TEST" contact in the contact field 11 functions as a program/test connection terminal which allows access to the antenna interface 16 for programming and testing thereof. The "RST" line is mutually connected to the "RST" contact in the contact field 11, to the antenna interface 16 and to a reset port RST of the microprocessor 14. Likewise, the "CLK" line is connected in parallel with the "CLK" contact in the contact field 11, to the antenna interface 16 and to a clock port CLK of the microprocessor 14. The $IO_2$ line is fed to the "$IO_2$" contact in the contact field 11, to the antenna interface 16 and to the second i/o port $IO_2$ of the microprocessor 14 (constituting a contactless i/o port thereof).

In order to select properly the required mode of operation, the microprocessor 14 is programmed to recognize an initial state at "power on" corresponding to the presence or absence of an electromagnetic field induced in the antenna coil 15. This, of course, can provide an indication as to whether data is to be transmitted in contactless mode, in which case the microprocessor 14 ignores any data on the line 13 transmitted thereto in "contact" mode and decodes any incoming data transmitted in "contactless" mode according to a predetermined "contactless" communications protocol. Alternatively, data is transmitted from the memory in the microprocessor 14 to an external reader in "contact" mode via the contact field 11 using the appropriate "contact" communications protocol.

Such an arrangement thus enables separate communications protocols to be employed for the bi-directional transmission of data in "contact" and "contactless" mode. Since employing the unmodified ISO Standard 7816 for "contactless" data transmission is unsuitable, this means that a microprocessor which has been pre-programmed for data transmission in "contact" mode using the ISO Standard 7816 is not suitable for direct bi-directional data transmission in "contactless" mode without further modification. The ISO 14443 standard for contactless data transmission has two transmission protocols known as Types "A" and "B". Type "A" reader to card communication allows for high modulation index having a modulation index of 100% and Type "B" reader to card communication allows for low modulation index having a modulation index of 10%. Both Types "A" and "B" use light load changes to modulate outgoing data back from the card to the reader, where the data is first used to modulate a sub-carrier signal at 847.5 KHz (using two different bit encoding schemes) and the resultant signal constitutes the modulating outgoing signal. The protocol set out in our above-mentioned U.S. Pat. No. 5,241,160 employs 100% modulation index for reader to card communication utilizing a custom PWM bit encoding scheme. For card to reader communication, it employs decoupling of the reader antenna, which is equivalent to a "heavy load" change. According to an alternative embodiment, "heavy loading" of the antenna coil is used instead of decoupling thereof for card to reader communication. In the following description, such "heavy loading" modulation for card to reader transmission in association with 100% modulation index for reader to card transmission, as taught in our U.S. Pat. No. 5,214,160, will be referred to as the "OTI protocol". In order to allow for contactless data transmission according to either of the ISO 14443 protocols or to the OTI protocol, the antenna interface 16 allows for data which has been modulated according to either scheme to be correctly processed. How this achieved, in practice, will become clearer from the following detailed description.

Figure 1B:
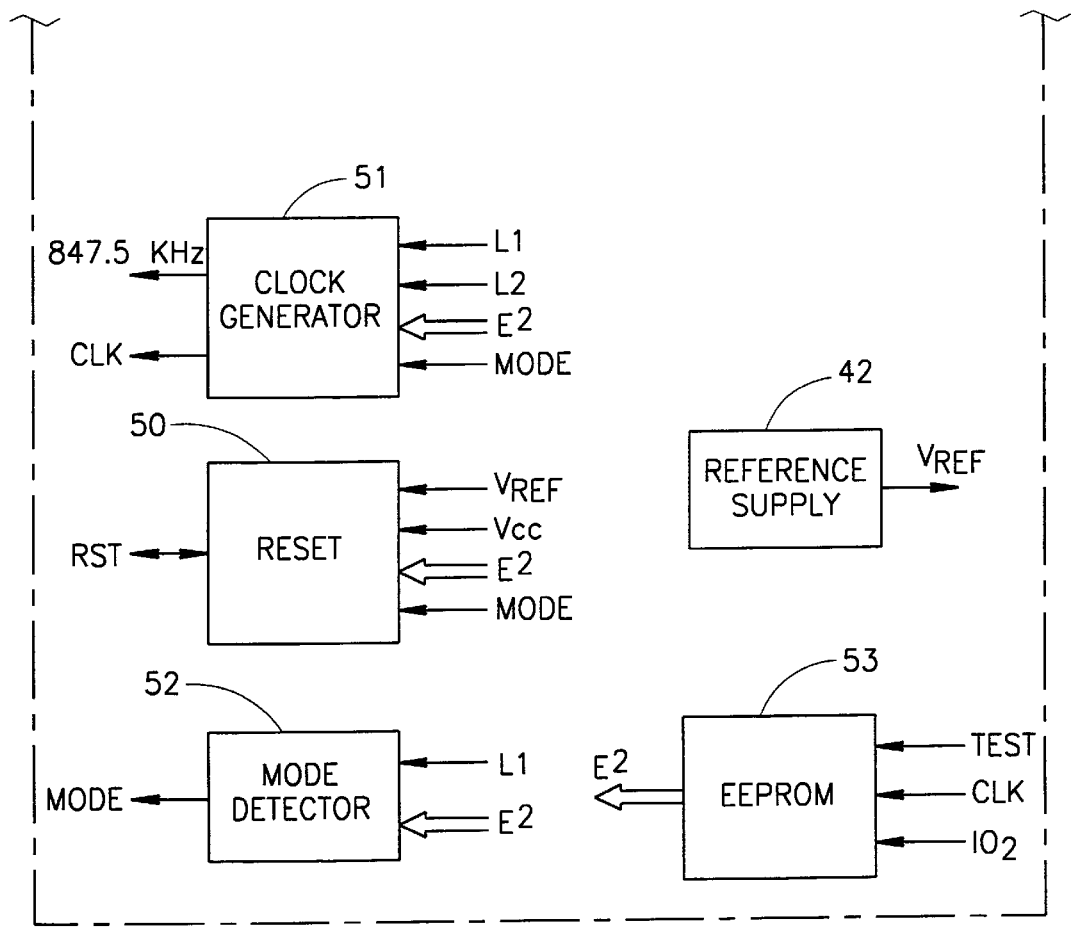
Figure 1C:
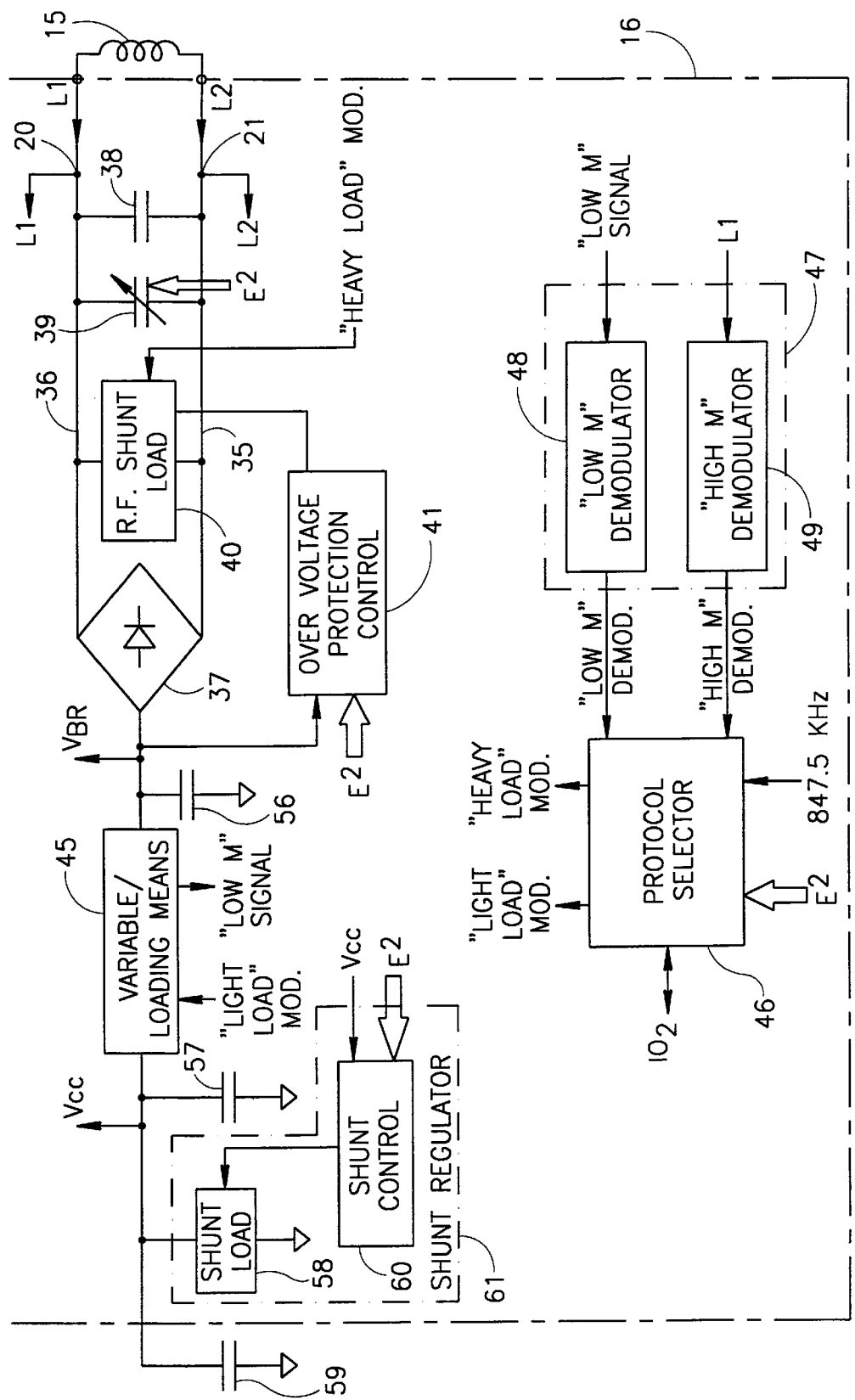

Having described the external connections of the antenna interface 16, the internal circuitry thereof will now be described with particular reference to FIGS. 1b and 1c of the drawings. Connected to the coil connection terminals 20 and 21 are AC voltage rails 35 and 36 for feeding an AC voltage thereacross when the antenna coil 15 is inductively coupled to an electromagnetic field, such as described in our above-mentioned U.S. Pat. No. 5,241,160.

Coupled across the AC voltage rails 35 and 36 is a bridge rectifier 37 whose negative output is connected to GND and whose positive output is connected to the high DC voltage terminal 22 so that when the data transaction card 10 is in contactless mode and a sufficiently strong electromagnetic field is induced across the antenna coil 15, a sufficiently high DC voltage level is produced by the bridge rectifier 37 for supplying power to the microprocessor 14 in parallel with the contact C1 in the contact field 11.

Coupled across the AC voltage rails 35 and 36 is a fixed capacitor 38 providing coarse tuning to the desired operating frequency, fine tuning being achieved by means of a tuning capacitor 39 whose capacitance may be varied as will be explained in greater detail below. Together with the antenna coil 15, the fixed capacitor 38 and the tuning capacitor 39 constitutes a resonant circuit whose resonant frequency is thus adjustable by altering the capacitance of the tuning capacitor 39.

The voltage appearing across the AC voltage rails 35 and 36 is dependent on the strength of the electromagnetic field induced across the antenna coil 15 and this, in turn, depends on the strength of the external electromagnetic field as well as the proximity of the antenna coil 15 thereto. In order to ensure that the voltage thus developed across the AC voltage rails 35 and 36 is never too large to damage the microprocessor 14, there is connected across the AC voltage rails 35 and 36 a r.f. shunt load 40 which ensures that the voltage across the AC voltage rails 35 and 36 may not exceed a predetermined threshold, $V_{MAX}$. The r.f. shunt load 40 is controlled by an overvoltage protection control 41 which is connected to the DC output $V_{BR}$ of the bridge rectifier 37. A further input $E^2$ is connected to a programming signal as will be described in greater detail below.

The high DC voltage Vcc is fed to the input of a reference voltage supply 42 which generates at an output thereof a voltage reference $V_{REF}$ which serves as the reference voltage for the remaining circuitry in the antenna interface.

In order to allow for the bi-directional transfer of data in contactless mode, the antenna interface 16 further includes a bi-directional data communications circuit including therein the r.f. shunt load 40 as well as a variable loading means 45, a protocol selector 46 and a demodulator 47. The r.f. shunt load 40 effects "heavy loading" of the antenna coil 15 in response to a "Heavy Mode" Modulation signal produced by the protocol selector 46. The variable loading means 45 effects light load changes to the antenna coil 15 responsive to a "Light Mode" Modulation signal produced by the protocol selector 46. It further extracts the "LOW M" signal in response to the reader to card low modulation index incoming signal for feeding to the demodulator 47. The protocol selector 46 is responsive to the $E^2$ signal for allowing operation of the data communication circuit according to a selected one of the above-mentioned protocols. The $IO_2$ data line connects the protocol selector 46 to the microprocessor 14 so as to allow for "contactless" bi-directional data communication therebetween. Respective "Light Load" and "Heavy Load" Modulation signals are produced by the protocol selector 46 in response to data on the $IO_2$ data line according to the $E^2$ signal fed thereto, these modulation signals being fed to the variable loading means 45 and to the r.f. shunt load 40, respectively. Also fed to the protocol selector 46 is the 847.5 KHz clock signal produced by the clock generator 51, constituting the sub-carrier signal on which data is superimposed by a sub-carrier modulator as described in greater detail with reference to FIG. 2 of the drawings. Respective "LOW M" and "HIGH M" demodulation signals are fed to the protocol selector 46 in response to corresponding signals produced by the demodulator 47, so as to select one of the two signals for feeding to the microprocessor 14 along the $IO_2$ data line. The demodulator 47 comprises a "LOW M" demodulator 48 which is responsive to the "LOW M" signal produced by the variable loading means 45 for extracting the data superimposed thereon for feeding the "LOW M" demodulation signal to the protocol selector 46. Likewise, a "HIGH M" demodulator 49 within the modulator 47 is responsive to the r.f. signal across the coil 15 for extracting the data superimposed thereon for feeding the "HIGH M" demodulation signal to the protocol selector 46.

A reset circuit 50 has an output RST connected to the reset connection terminal "RST" of the microprocessor 14 for effecting different resets according to whether the data transaction system 10 is in contact mode or contactless mode. The reset circuit 50 is fed voltage from the high voltage DC rail Vcc and is responsive to the reference voltage $V_{REF}$ and to a mode status flag MODE indicating whether the data transaction system 10 is operating in contact mode or contactless mode. The reset circuit 50 has a further input $E^2$ connected to a programming signal as will be described in greater detail below.

Timing signals to the microprocessor 14 are provided by means of a clock generator 51 having an input coupled to the AC voltage rails 35 and 36 so as to be responsive to the frequency of the electromagnetic field across the antenna coil 15 for providing the required timing signals. The clock circuit 51 like the reset circuit 50 described above, is responsive to the mode status flag MODE and has a further input $E^2$ connected to a programming signal as will be described in greater detail below.

In order to provide the required mode status flag MODE which is fed to the reset circuit 50 and the clock generator 51, there is provided a mode detector 52 having an input connected to the A.C. voltage rail 35 so as to detect the presence of the electromagnetic field across the antenna coil 15 when the data transaction system 10 is in contactless mode. In this case, the output MODE of the mode detector 52 is set to logic "0"; otherwise it is set to logic "1".

Operation of the antenna interface 16 may be controlled and customized by means of an EEPROM 53 and a programming unit (not shown). The programming unit is connected to the EEPROM 53 so as to allow desired programming and data signals to be fed to the EEPROM 53. Specifically, during an initial programming stage, a voltage of 5 V is fed to the antenna interface 16 via the contact "TEST" in the contact field 11 when data is to be entered into the programming unit. During a subsequent "burn in" stage, an elevated voltage of 12 V is fed thereto when the data is to be written to the EEPROM 53. Programming of the EEPROM 53 via the programming unit is accomplished by clocking a data string into a shift register within the programming unit via the data i/o contact "$IO_2$" of the contact field 11. The programming data is fed serially so as to fill the shift register, whereupon the contents of the shift register are loaded into the EEPROM 53 by applying a 12 volt DC level to the contact "TEST" in the contact field 11. During this procedure, the clock signal which is fed to the programming unit is not derived by the clock generator 51 but, rather, is fed externally via the contact "CLK" in the contact field 11. Different $E^2$ outputs of the EEPROM 53 are fed to the tuning capacitor 39, the overvoltage protection 41, the reference voltage generator 42, the protocol selector 46, the reset circuit 50, the clock generator 51 and the shunt regulator 61. Likewise, in order that the output MODE may be set to a desired logic level regardless of the presence or absence of the electromagnetic field across the antenna coil 15, the mode detector 52 is also responsively coupled to the EEPROM 53 so that its status can be programmed.

Different bits of the EEPROM 53 contain control parameters for altering the characteristics of the antenna interface 16. Specifically, three types of control parameter are stored in the EEPROM 53, these being (i) magnitude selection parameters, (ii) configuration selection parameters and (iii) enable/disable parameters. The magnitude selection parameters allow for customization and/or optimization of the reference voltage $V_{REF}$, the Vcc threshold sensed by the reset circuit 50, the capacitance of the tuning capacitor 39, the clock output frequency of the clock generator 51, the Vcc limit level controlled by the shunt regulator 61 and the overvoltage protection clamp level controlled by the overvoltage protection control 41. The configuration selection parameters configure the protocol selector 46 to operate according to the required protocol. Likewise, circuit elements (not shown) within the antenna interface 16 are connected to the output of the EEPROM 53 and are responsive to the enable/disable control parameters so that they can be permanently disabled. The EEPROM 53 thus constitutes an encoding means for encoding whether selected circuit components are to be enabled or disabled.

The reset circuit 50 effects different resets according to whether the data transaction system 10 is in contact or contactless mode. Specifically, in contact mode the output RST of the reset circuit 50 goes tristate so as to allow the microprocessor reset to be fed externally to the microprocessor 14 via the contact "RST" in the contact field 11. In contactless mode, an active LOW reset signal is fed to the microprocessor 14 and the reset condition depends on the level of the high voltage DC rail Vcc in accordance with data stored in the EEPROM 53. Thus, if Vcc is greater than a predetermined threshold $V_{HIGH}$ stored in the EEPROM 53, then the output RST goes HIGH. On the other hand, if the value of Vcc is less than a predetermined threshold $V_{LOW}$ stored in the EEPROM 53, then the output RST goes LOW.

A first capacitor 56 is connected between $V_{BR}$ and GND whilst a second capacitor 57 is connected between $V_{CC}$ and GND. Optionally a high capacitance external capacitor 59 may be connected between $V_{CC}$ and GND and stores charge during the time that an electromagnetic field appears across the coil 15. The stored charged is then discharged and serves to supply energy to the data transaction card's electronics during an absence of the electromagnetic field across the antenna coil 15. Alternatively, when a low index modulation is required in accordance with Type "B" ISO 14443, then during manufacture of the data transaction card 10, the external capacitor 59 may be dispensed with so as to reduce the overall bulk of the data transaction card 10. Regardless of whether or not a discrete external capacitance is connected, there will always be some intrinsic capacitance associated with the microprocessor 14 and this is thus constituted, at least partially, by the external capacitance 59 shown in FIG. 1. Within the context of the annexed claims, it is to be understood that the external capacitance minimally relates to the intrinsic capacitance of the microprocessor 14 and optionally also may include a discrete capacitance connected across the antenna interface 16.

The shunt load 58 serves the purpose of maintaining the voltage $V_{CC}$ to within a required level. The shunt load 58 is controlled by a shunt control 60 responsive to the DC line voltage Vcc and having a further input $E^2$ connected to a programming signal. The shunt load 58 in combination with the shunt control 60 constitutes a shunt regulator 61 as will be described in greater detail below with particular reference to FIGS. 6a and 6b of the drawings.

Figure 2:
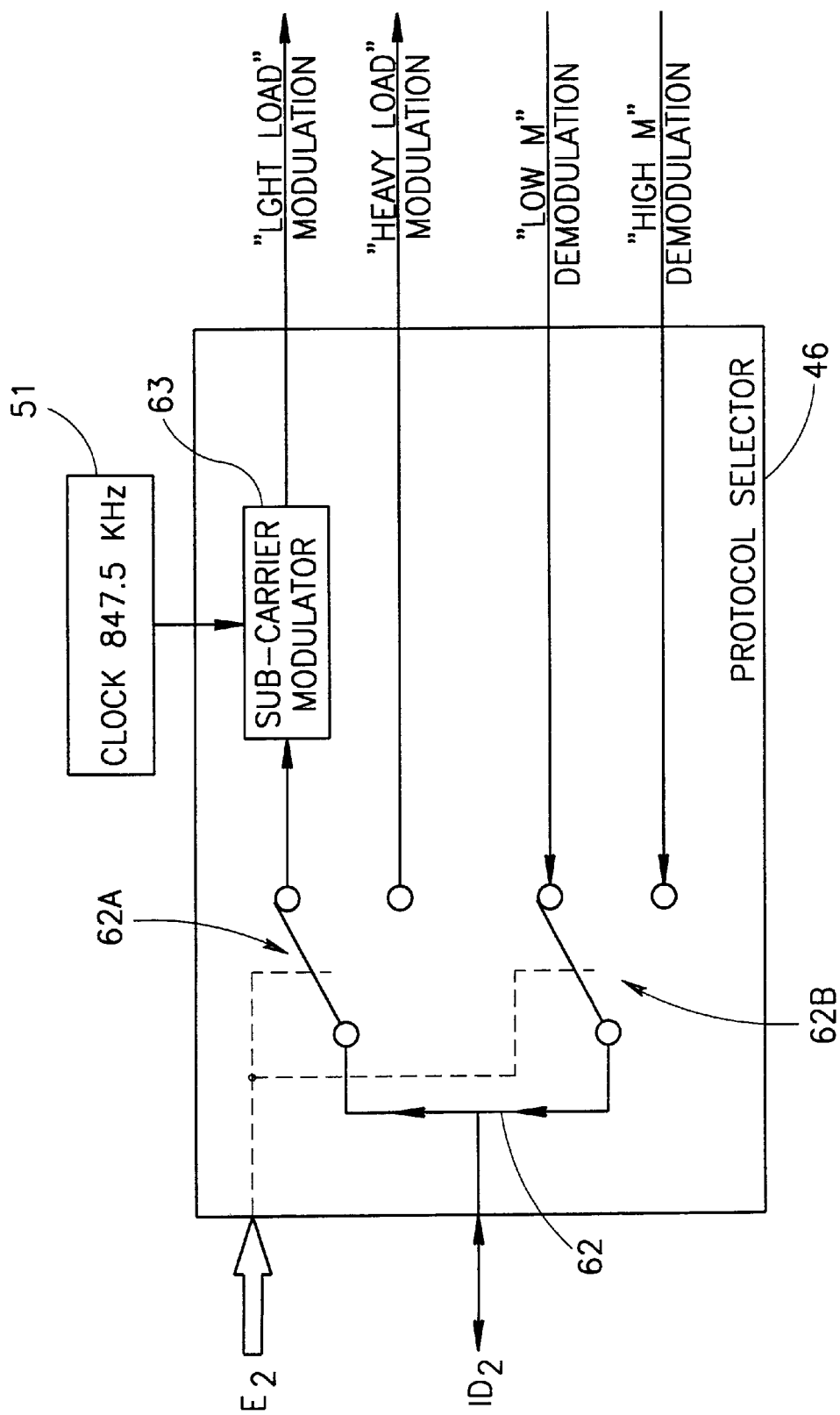
FIG. 2 shows schematically a protocol selector within the antenna interface shown functionally in FIGS. 1a to 1c.

FIG. 2 shows schematically and in simplified form the protocol selector 46 which, in effect, acts as a two-pole two-way protocol selector switch 62 having switch elements 62a and 62b which are independently responsive to the $E^2$ signal for selecting either "Light Load" or "Heavy Load" modulation and either "LOW M" or "HIGH M" demodulation, respectively. For the purpose of achieving "Light Load" modulation, there is connected a sub-carrier modulator 63 to the appropriate switch contact of the switch element 62a and which is responsive to the 847.5 KHz clock signal for modulating the outgoing data to be sent by the card to the reader. ISO Types "A" and "B" protocols each employ a respective bit-encoding scheme: Type "A" employs Manchester ON/OFF keying for modulating the sub-carrier with the outgoing data, whilst Type "B" employs NRZ BPSK for modulating the sub-carrier with the outgoing data. Selection of the desired modulation scheme is achieved by virtue of the $E^2$ signal fed to the protocol selector 46. The sub-carrier modulation is active only for card to reader communication. The sub-carrier modulator 63 may be any of many conventional well known circuits.

Figure 3:
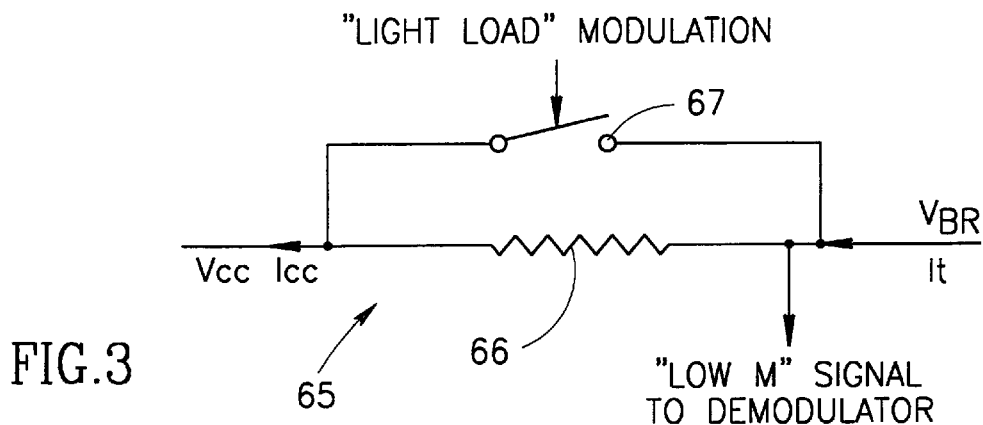
FIG. 3 shows schematically a detail of a variable loading means according to a first embodiment of the invention.

FIG. 3 shows schematically a detail of the variable loading means according to a first embodiment of the invention designated generally as 65 and including a resistor 66 having connected thereacross a switch 67. The impedance of the variable loading means 65 varies from zero to the resistance of the resistor 66 according to whether the switch 67 is closed or open, whereby modulation of the signal may be achieved by opening and closing the switch 67 as a function of the outgoing data. As seen in FIG. 1c, the voltage on one terminal of the resistor 66, which is part of the data communications circuit 45, is Vcc whilst the voltage on the other terminal proximate the bridge rectifier 37 is $V_{BR}$. The signal derived from the junction of the resistor 66 and the bridge rectifier 37 is proportional to the current $I_t$ supplied via the bridge rectifier 37. The current $I_t$ is proportional to the amplitude of the carrier signal generated by the reader and hence is proportional to the modulated signal which must be demodulated in order to extract the incoming data superimposed on the carrier signal by the reader. Thus, the resistor 66 is an integral component of the demodulator operation since it is via the resistor 66 that the demodulator 47 derives its input signal.

It is, of course, known to vary the load across an antenna coil in order to modulate a carrier signal with outgoing data stored in a memory of a data transaction device. However, hitherto proposed loading techniques employ a variable load connected in parallel with the antenna coil either on the r.f. side directly in parallel with the antenna coil or on the D.C. side after rectification of the incoming signal. "Heavy" loading is best achieved by connecting the variable load in parallel with the antenna coil on the r.f. side. However, if such a scheme is used for "Light" loading modulation, the voltage changes seen at the r.f. side are essentially the same as those seen at the output of the bridge rectifier. This being the case, it is preferable to connect the variable load on the D.C. side of the antenna coil because it is much more difficult to realize an r.f. switch which is responsive to a desired modulation level than at the D.C. side.

The present invention contemplates the connection of an external capacitor 59 having a large capacitance at the D.C. side between Vcc and GND in order to maintain power during power interruption associated with OTI and ISO Type "A" protocols. However, when the large external capacitor 59 is connected, any effect of low index reader to card signal demodulation (ISO Type "B") by sampling Vcc or the A.C. voltage rails, and any effect of card to reader signal modulation by parallel light loading, either on the D.C. side or the r.f. side (ISO Types "A" and "B"), is masked by the external capacitor to the extent that reader to card modulation cannot be detected by the card, and card to reader modulation cannot be detected by the reader. It is true that the external capacitor is redundant when ISO Type "B" protocol only is used, but typically it is connected during manufacture when, of course, it is not known which protocol will be employed and when, therefore, the option must be left available for all types of modulation.

In the invention, as described schematically with reference to FIG. 3, these drawbacks are overcome by exploiting the series resistance. By connecting the resistor 66 in series the remaining circuitry as opposed to the known parallel load connection thereof, the masking effect is completely eliminated and the presence of the large external capacitor 59 actually boosts both the outgoing and the incoming signals by maintaining Vcc constant during the relatively fast changes associated with the outgoing and the incoming signals.

Figure 4A:
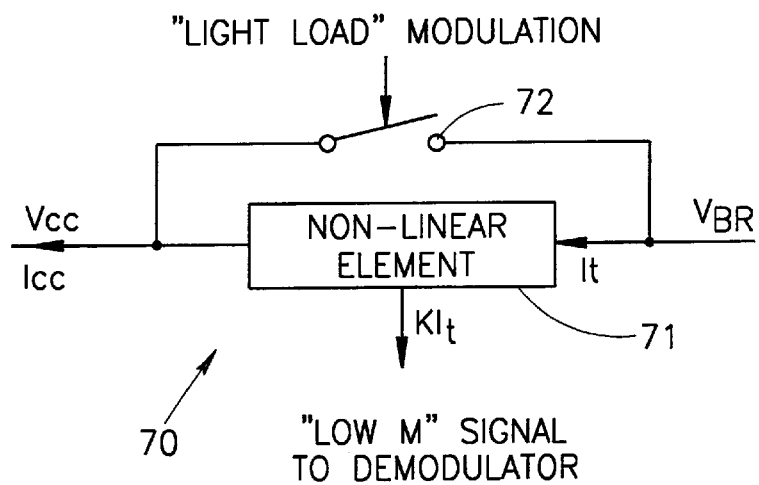
FIG. 4a shows schematically a detail of a variable loading means according to a second embodiment of the invention.
Figure 4B:
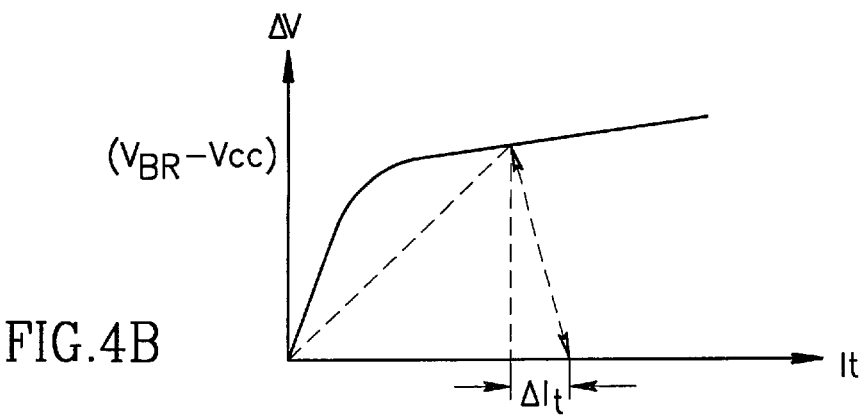

FIG. 4a shows schematically a detail of the variable loading means according to a second embodiment of the invention designated generally as 70 and including a non-linear element 71 having a voltage/current characteristic as shown graphically in FIG. 4b. Connected across the non-linear element 71 is a switch 72 whereby the impedance of the variable loading means 70 may be varied from zero to the impedance of the non-linear element 71 according to whether the switch 72 is closed or open. Thus, when the switch 72 is open, the voltage appearing across the non-linear element 71 is $V_t$, whilst when the switch 72 is closed the voltage across the non-linear element 71 falls to zero and the current rises by $\rightarrow I_t$. By such means, modulation of the signal may be achieved by opening and closing the switch 72 as a function of the outgoing data. Demodulation of the low index reader to card signal is achieved by syphoning off a small portion $k \times I_t (k<<1)$ of the current $I_t$. The current $I_t$ supplied via the bridge rectifier 37 is proportional to the amplitude of the modulated carrier signal generated by the reader and hence that small component which is syphoned off is also proportional to the modulated signal which must be demodulated in order to extract the incoming data superimposed on the carrier signal by the reader. The current $k \times I_t$ constitutes the "LOW M" signal fed to the demodulator 47.

Figure 5A:
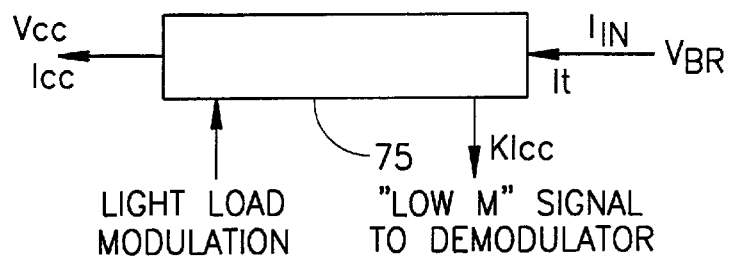
FIG. 5a shows schematically a detail of a variable loading means according to a third embodiment of the invention employing a non-linear element having a controllable voltage/current characteristic.
Figure 5B:
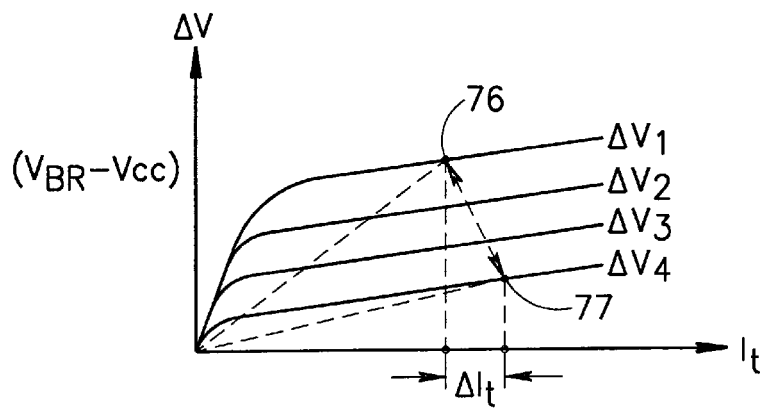

FIG. 5a shows schematically a detail of the variable loading means according to a third embodiment of the invention including a non-linear element 75 having a controllable voltage/current characteristic as shown graphically in FIG. 5b. By controlling which voltage/current characteristic is operative at any given time, the impedance of the variable loading means 75 may be varied. For example, if the initial characteristic corresponds to the point 76 on the curve $\rightarrow V_1$ and the operating characteristic is now changed to the point 77 on the curve $\rightarrow V_4$, the current through the non-linear element 75 rises by $\rightarrow I_N$. By such means, modulation of the signal may be achieved by selecting different operating characteristics as a function of the outgoing data. The demodulation is achieved in similar manner to that described above with reference to FIG. 4a of the drawings.

Figure 6A:
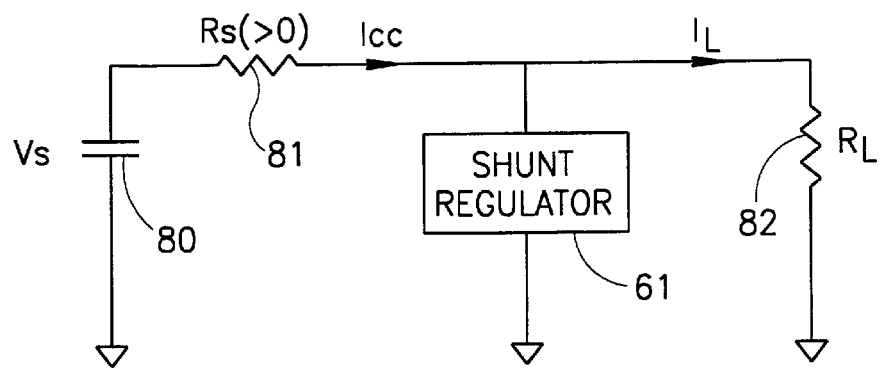
FIG. 6a is a functional representation of the shunt regulator depicted in FIG. 1c.

FIG. 6a is a schematic representation showing the operation of the shunt regulator 61. A voltage source 80 having a voltage $V_S$ together with a series resistor 81 having a resistance $R_S$ models the energy supply by the reader to the card via the coil 15. A load, represented by a resistor 82 having a resistance $R_L$ connected to the junction of the shunt regulator 61 and the resistor 81 represents the impedance of the remaining circuitry of the card.

Figure 6B:
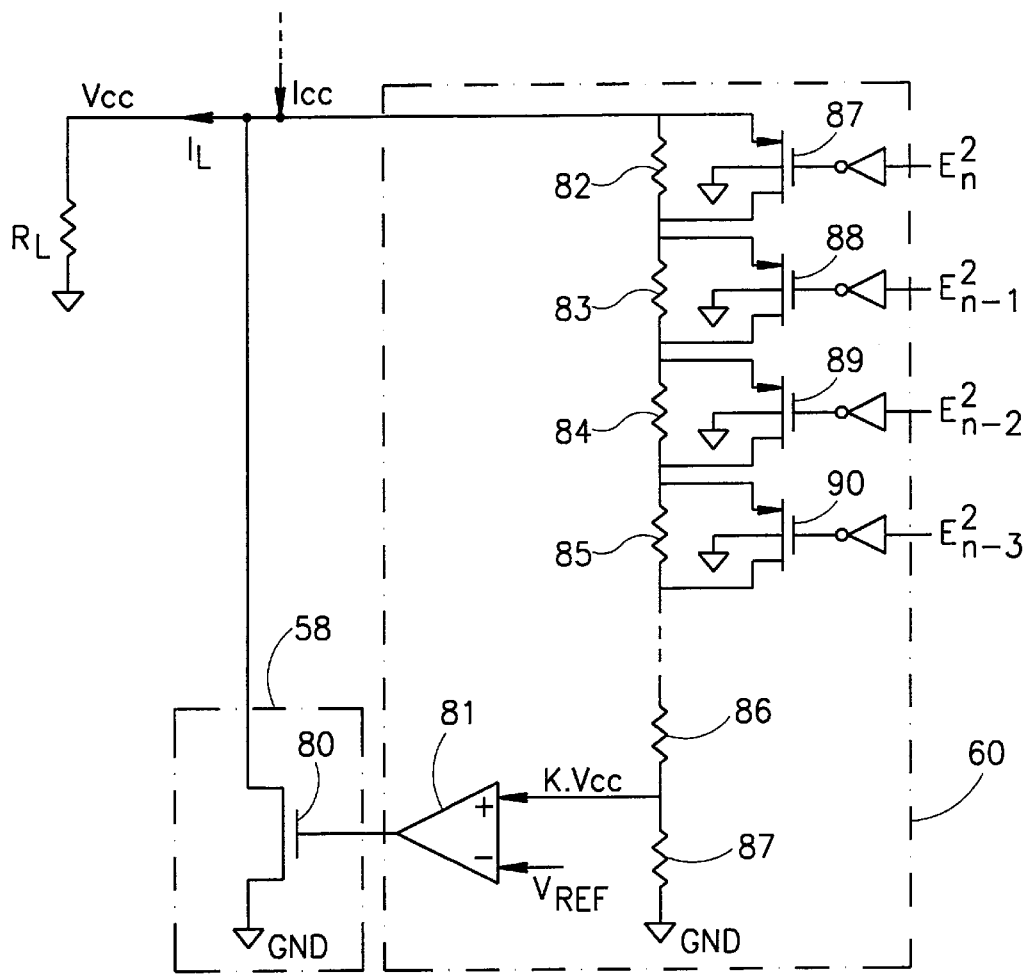

FIG. 6b is a circuit diagram showing schematically a detail of the shunt regulator 61 comprising the shunt load 58 and shunt control 60. The shunt load 58 is a MOSFET 80 and the shunt control 60 comprises an OP AMP 81 whose inverting input is connected to a reference voltage $V_{REF}$ and to whose non-inverting input is connected a voltage equal to k. $V_{CC}$ derived via a bank of resistors 82, 83, 84, 85, 86 and 87 connected between Vcc and GND. The current passing through the bank of resistors may be varied by shorting different ones of the resistors 82 to 85 by means of corresponding MOSFET switches 87, 88, 89 and 90 whose gate terminals are connected to a respective bit in the EEPROM 53. Thus the factor k may be controlled by varying the contents of the EEPROM 53. The resultant closed-loop configuration of the shunt regulator 61 thus acts to limit the voltage Vcc so as to not to exceed a controllable level.

Figure 7:
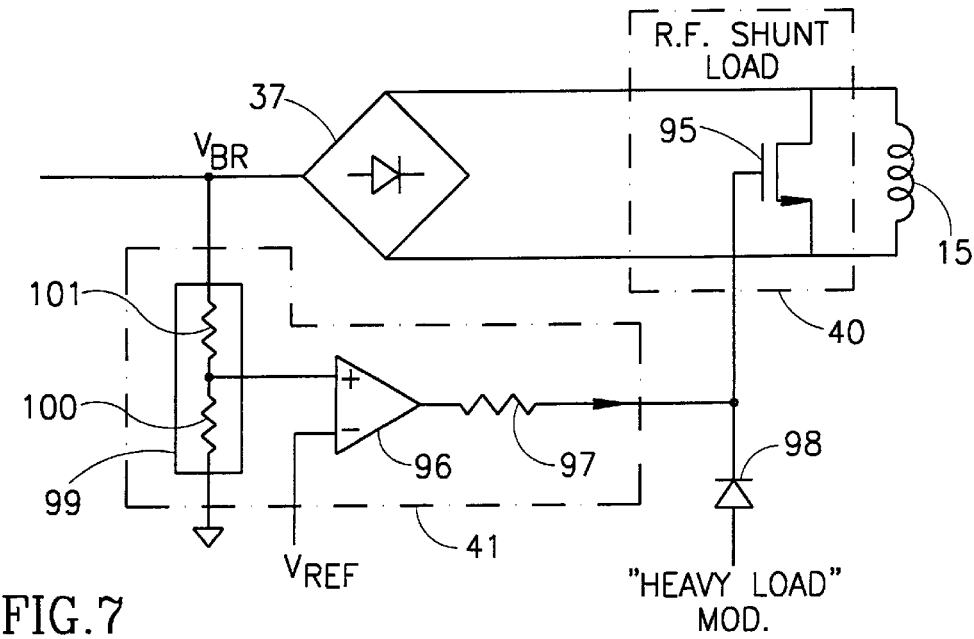
FIG. 7 shows schematically operation of a controllable r.f. shunt load within the antenna interface of the data transaction card.

FIG. 7 is a circuit diagram showing schematically a detail of the r.f. shunt 40 and overvoltage control 41. The r.f. shunt 40 is realized by a MOSFET 95 connected across the coil connection terminals 20 and 21 whilst the overvoltage control circuit 41 comprises an OP AMP 96 whose output is fed to the gate of the MOSFET 95 via a resistor 97. Also fed to the gate of the MOSFET 95 via a rectifier diode 98 is the "Heavy Load" modulation signal derived from the protocol selector 46. A reference voltage $V_{REF}$ is fed to the inverting input of the OP AMP 96 whilst to the non-inverting input thereof is fed a voltage signal derived from a controllable voltage divider 99 connected between the output voltage rail $V_{BR}$ of the bridge rectifier 37 and GND. The voltage divider 99 is shown schematically to comprise two resistors 100 and 101, although, in practice, the resistor 101 comprises a series of resistors similar in construction to the bank of resistors 82 to 85 shown in FIG. 6b and each being switchable via a corresponding MOSFET switch controlled by respective outputs of the EEPROM 53. By such means, the effective resistance of the resistor 101 may be varied and this, in turn, allows the fractional voltage applied to the OP AMP 96 also to be varied.

The function of the r.f. shunt load 40 together with the overvoltage protection control 41 is to limit the maximum D.C. voltage $V_{BR}$ at the output of the bridge rectifier 37 when the field strength of the electromagnetic field across the antenna coil 15 is too high. Without such limitation, bringing the data transaction card 10 into closer proximity to the reader, for example, might so increase the electromagnetic field across the antenna coil 15, that the resultant increase in the D.C. voltage $V_{BR}$ could destroy the CMOS circuitry in data transaction card 10.

The operation of the r.f. shunt load 40 and associated control circuit 41 is as follows. When the electromagnetic field strength across the antenna coil 15 increases, the voltage $V_{BR}$ at the output of the bridge rectifier 37 increases. As a result, the fractional voltage appearing across the resistor 99 and applied to the non-inverting input of the OP AMP 96 also increases. The voltage applied via the resistor 97 to the gate of the MOSFET 95 therefore increases thereby decreasing its impedance. The load applied across the antenna coil 15 thereby increases, thus tending to reduce the A.C. voltage across the bridge rectifier 37 and so reducing the D.C. voltage $V_{BR}$. The reverse applies when the electromagnetic field strength across the antenna coil 15 decreases whereupon the impedance of the MOSFET 95 rises thereby tending to increase the D.C. voltage $V_{BR}$.

FIG. 8a is a circuit diagram of the "LOW M" demodulator 48. A comparator 105 has an inverting input tied to GND there being connected to a non-inverting input thereof a conventional differentiator comprising a capacitor 106 both of whose terminals are tied to GND via respective resistors 107 and 108. The "LOW M" signal is fed to the junction of the capacitor 106 and the resistor 108.

FIGS. 8b, 8c and 8d show, respectively, the input data signal, the differentiated signal fed to the non-inverting input of the OP AMP 105 and the data signal appearing at the output of the comparator.

FIG. 9a is a circuit diagram of the "HIGH M" demodulator 49. A comparator 110 has an inverting input tied to GND there being fed to a non-inverting input thereof a modulated high frequency carrier signal via a diode 111. A capacitor 112 is connected between the non-inverting input of the OP AMP 110 and GND in parallel with a resistor 113.

Figure 9B:
Figure 9C:

FIGS. 9b and 9c show, respectively, the high index, reader to card modulated carrier signal and the data signal appearing at the output of the comparator.

Figure 10:
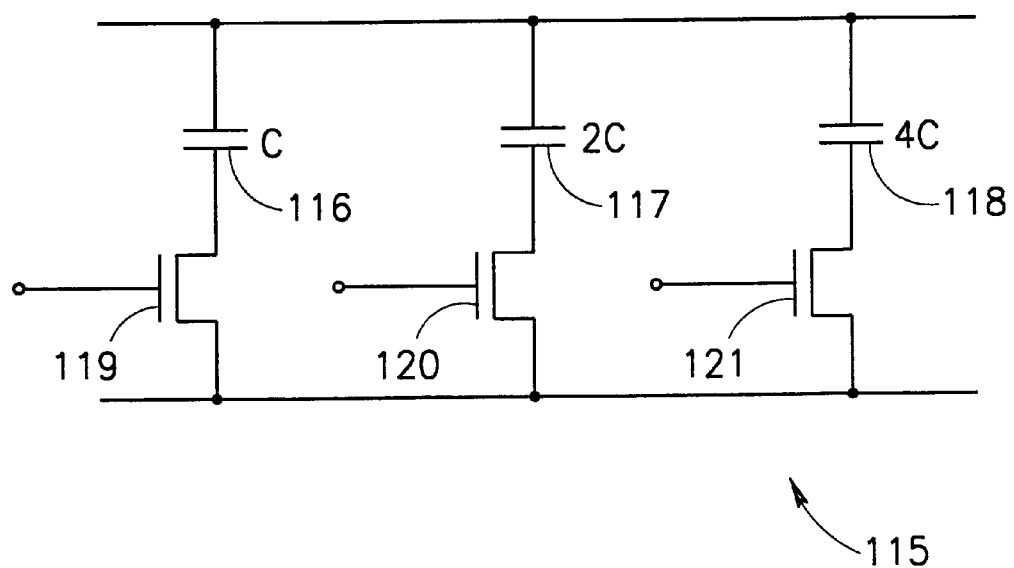
FIG. 10 shows schematically a circuit for selecting the tuning capacitance of the antenna resonant circuit using the EEPROM.

Reference is now made to FIG. 10 where use of the EEPROM 53 is described for selecting one of eight predetermined values ranging from zero through 7C for the tuning capacitor 38 in the antenna interface 16. The tuning capacitor 38 is implemented by a capacitor bank shown generally as 115 and comprising three capacitors 116, 117 and 118 connected in parallel and having respective capacitances equal to C, 2C and 4C. Thus, by connecting selected ones of the capacitors in circuit, the total capacitance of the capacitor bank 115 may be varied from zero (when none of the capacitors is connected) to 7C (when all the capacitors are connected).

In order to provide the required selection, each of the capacitors 116, 117 and 118 is connected in series with a corresponding MOSFET 119, 120 and 121 whose gate terminals are connected to a respective bit in the EEPROM 53 which thus provides the gate voltage HIGH or LOW for switching each MOSFET on or off. By such means, the corresponding bits in the EEPROM 53 effect enabling or disabling of the capacitors 116, 117 and 118 allowing the capacitance of the capacitor bank 115 to be varied as required. The number of different capacitance levels thus selectable is, of course, equal to $2^N$ where N is the number of capacitors in the capacitor bank 115 having respective capacitances ranging in value from C to $C \times 2^{(N-1)}$ and each being selectable by a dedicated bit of the EEPROM 53. By such means, the net capacitance of the capacitor bank 115 may be varied from zero through $C \times (2^N - 1)$.

FIG. 11 summarizes the relationship between the output RST of the reset circuit 50 as a function of the DC voltage Vcc. Thus, it is noted that as the value of Vcc rises, the reset voltage RST may rise slightly until, at a certain level equal to approximately 1 V, the reset voltage RST falls and remains LOW until Vcc reaches the threshold $V_H$, whereupon the reset voltage RST goes HIGH. As Vcc is now reduced, the value of the reset voltage RST slowly falls in proportion to the fall in Vcc, until Vcc reaches the voltage threshold $V_L$ whereupon the reset voltage RST goes from HIGH to LOW. The difference between the two voltage thresholds $V_H$ and $V_L$ defines the degree of hysteresis associated with the reset circuit 50 and is adjustable in accordance with a control parameter fed by the EEPROM 53 to the reset circuit 50.

The clock generator 51 creates different clock signals according to whether the data transaction system 10 is in contact or contactless mode. Specifically, if in contact mode, the clock 51 is tristate so as to allow the desired clock signal CLK to be fed externally to the microprocessor 14 via the contact "CLK" in the contact field 11. In contactless mode, there is fed to the microprocessor 14 a clock signal whose frequency is an integer division of the transmitted carrier signal, the division ratio being variable and set by respective $E^2$ bits in the EEPROM 53.

FIG. 12 shows, in tabular form, a comparison of the control signals and data fed to the microprocessor 14 and the antenna interface 16 in contact mode and contactless mode, respectively. In contact mode, the reset signal RST and the clock signal CLK are fed to the microprocessor 14 via the respective contacts in the contact field 11. In contactless mode, no external signals are fed via the contact field 11, and the reset signal RST and the clock signal CLK are produced by the reset circuit 50 and the clock generator 51, respectively.

The mode status flag MODE produced by the mode detector 52 within the antenna interface 16 is set to logic "0" for contactless mode and is set to logic "1" for contact mode. The mode status flag MODE is used by the control logic within the antenna interface 16 in order to dictate its manner of operation as will be explained in greater detail below with reference to FIG. 14 of the drawings.

The microprocessor 14 determines which state of operation is required, i.e. contact or contactless, by sampling the i/o data line $IO_2$ connected to the antenna interface 16. In the event that the data transaction card 10 is inserted into a card reader and data is fed externally to the contact field 11, then this is done through the contact "$IO_1$" which is connected to the i/o data line $IO_1$ of the microprocessor 14. In this case, no data is seen by the i/o data line $IO_2$ of the microprocessor 14 which therefore knows that the data transaction system 10 is operating in contact mode. The reverse is true in contactless mode when data is, indeed, fed via the data i/o line $IO_2$ to the contactless i/o data line $IO_2$ of the microprocessor 14. It is thus to be noted that both the microprocessor 14 and the antenna interface 16 determine whether to operate in accordance with contact or contactless mode.

In contact mode, the microprocessor 14 receives timing signals externally from the card reader via the contact "CLK" in the contact field 11. Likewise, in contactless mode, a similar form of clock signal, CLK, is produced by the clock generator 51 and is fed to the microprocessor 14. So far as the antenna interface 16 is concerned, here again in contactless mode, the clock signal, CLK, is produced by the clock generator 51, no signal being applied externally to the contact "CLK" of the contact field 11. On the other hand, in contact mode, the clock signal, CLK, is indeed fed externally via the contact "CLK" in the contact field 11 and, in order not to interfere with this signal, the output of the clock generator 51 goes tristate.

In contact mode, data transmission between the contact "$IO_1$" in the contact field 11 and the microprocessor 14 is effected using a data communications protocol conforming to ISO 7816. In contactless mode, data transmission is effected between the microprocessor 14 and the i/o data line $IO_2$ of the antenna interface 16 using a contactless protocol as described above.

Figure 13:
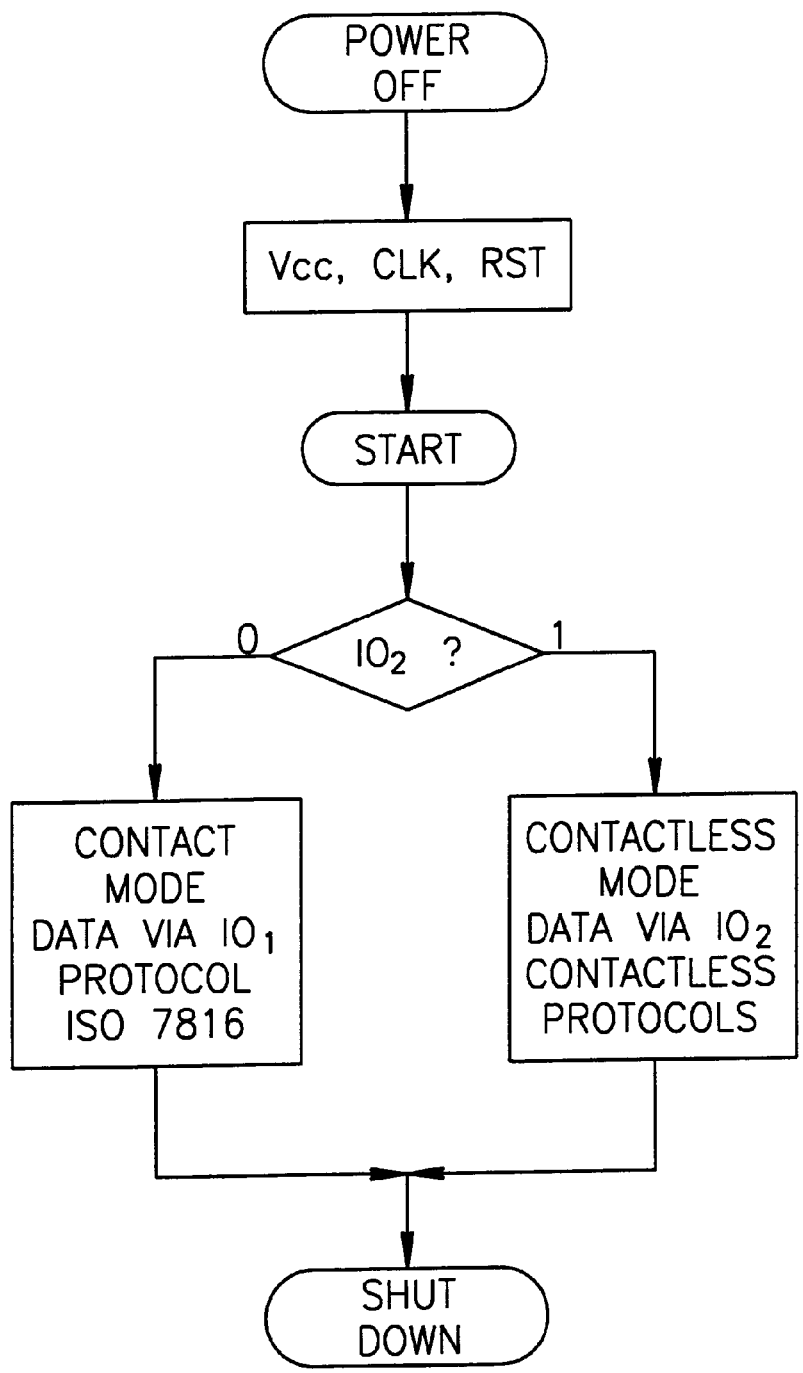
FIG. 13 is a flow diagram showing the principal operating steps on powering up a microprocessor having two data I/O ports.

FIG. 13 is a flow diagram summarizing the essential operating steps of the microprocessor 14 from an initial "power off" state. Operation of the microprocessor 14 commences when all three of the Vcc, CLK and RST signals are fed thereto either via the appropriate contacts in the contact field 11 or, alternatively, via the antenna interface 16. Upon "power on", the i/o data line $IO_2$ is sampled, as explained above, in order to determine the presence of an electromagnetic field corresponding to contactless mode or its absence corresponding to contact mode. In the case of contact mode, the microprocessor 14 knows that both incoming and outgoing data is to be channeled via the i/o data line $IO_1$ in accordance with a communications protocol conforming to ISO 7816. In the case of contactless mode, the microprocessor 14 knows that both incoming and outgoing data is to be channeled via the i/o data line $IO_2$ in accordance with a contactless protocol stored within the microprocessor 14.

Figure 14:
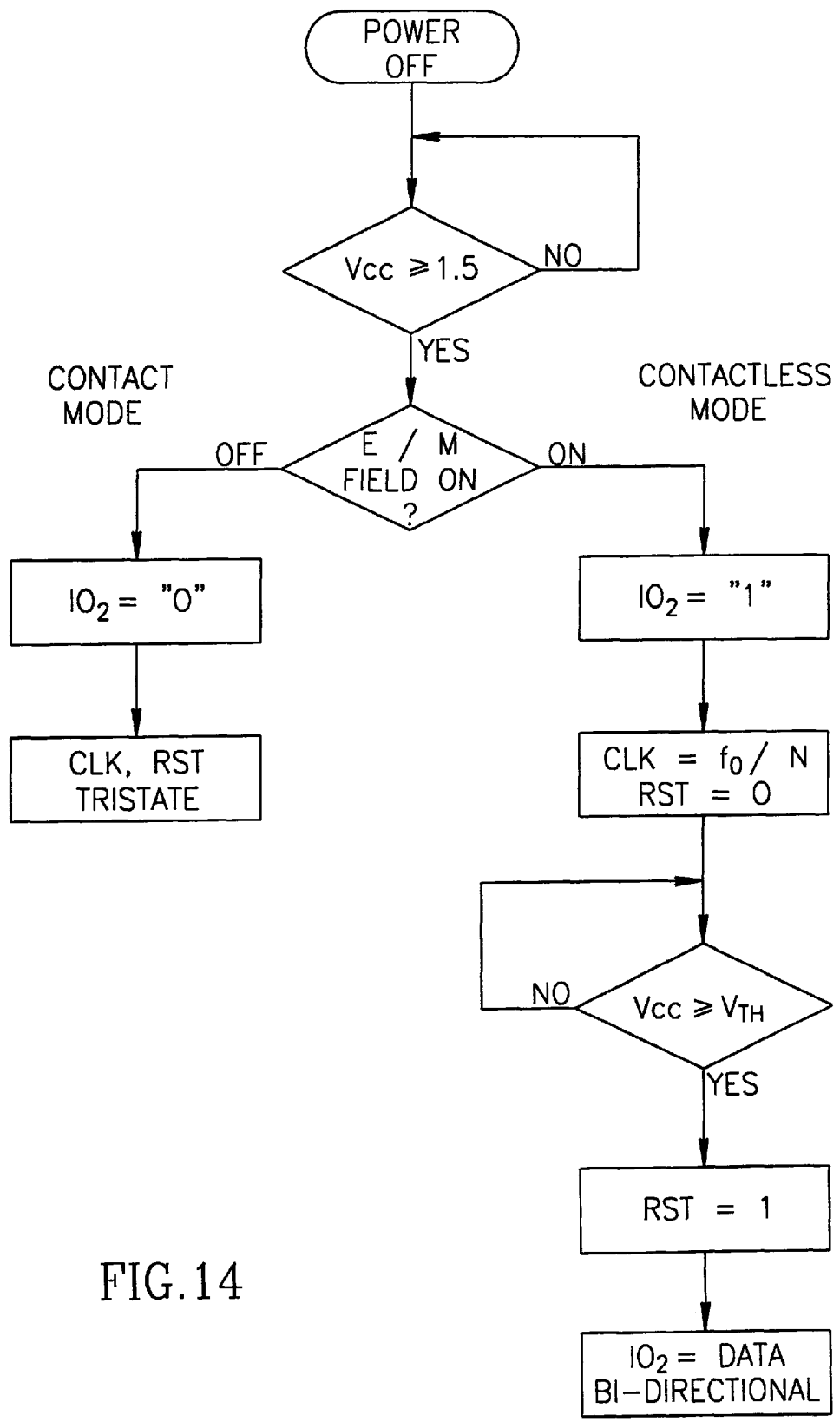
FIG. 14 is a flow diagram showing the principal operating steps associated with powering up the antenna interface when connected to a microprocessor having two data I/O ports.

FIG. 14 is a flow diagram showing the principal operating steps associated with the antenna interface 16 from an initial "power off" state. The value of the D.C. supply voltage Vcc output by the bridge rectifier 37 is constantly sampled and compared with a stored threshold, typically equal to 1.5 V below which there is insufficient voltage to energize the circuitry within the antenna interface 16. When the voltage Vcc climbs above the minimum threshold, the mode detector 52 operates in order to establish whether contact or contactless mode is required. In contact mode, a flag $IO_2$ is set to "0" and as explained above, the clock signal CLK and the reset signal RST are both set to tristate. On the other hand, in contactless mode, the flag $IO_2$ is set to "1", the reset signal RST is set to "0", (i.e. its active LOW level) and the clock output CLK is set to a frequency equal to $f_o/N$ where $f_o$ is the input frequency of the carrier signal typically equal to 13.56 MHz and N is a division factor stored in the EEPROM 53, typically equal to 3, 4, 6 or 8. By such means the clock frequency may be adjusted by the end user according to specific requirements.

Thereafter, the magnitude of the supply voltage Vcc is continually compared with a voltage threshold, $V_{TH}$ whose value is likewise stored in the EEPROM 53 such that when the supply voltage Vcc exceeds the voltage threshold, $V_{TH}$, the reset signal, RST, goes HIGH, logic "1". The value of the flag $IO_2$ is equal to the data fed thereto via the bi-directional data communications circuit 45.

The two comparisons of Vcc with the minimum threshold voltage of 1.5 V and with the threshold voltage $V_{TH}$ are both performed in the background continuously. They serve to ensure that the antenna interface 16 is only awakened when the voltage Vcc exceeds the minimum threshold of 1.5 V; and that data transmission is effected only when the carrier wave constituted by the electromagnetic wave across the coil antenna 15 is sufficiently strong that the supply voltage Vcc exceeds the minimum voltage threshold $V_{TH}$ which itself is greater than 1.5. As the data transaction card 10 is moved in and out of the external magnetic field, the voltage induced across the coil antenna 15 will vary and it is necessary, therefore, to interrupt data transmission when there is insufficient induced voltage until the induced voltage is again sufficiently large.

The microprocessor 14 shown in FIG. 1 has two data I/O ports denoted $IO_1$ and $IO_2$ and thus allow simple determination as to whether the data derives from the contact field 11 or the antenna interface 16. However, the antenna interface 16 may be further customized via the EEPROM 53 so as to allow such distinction even when used with microprocessors having only a single data I/O port.

Figure 15:
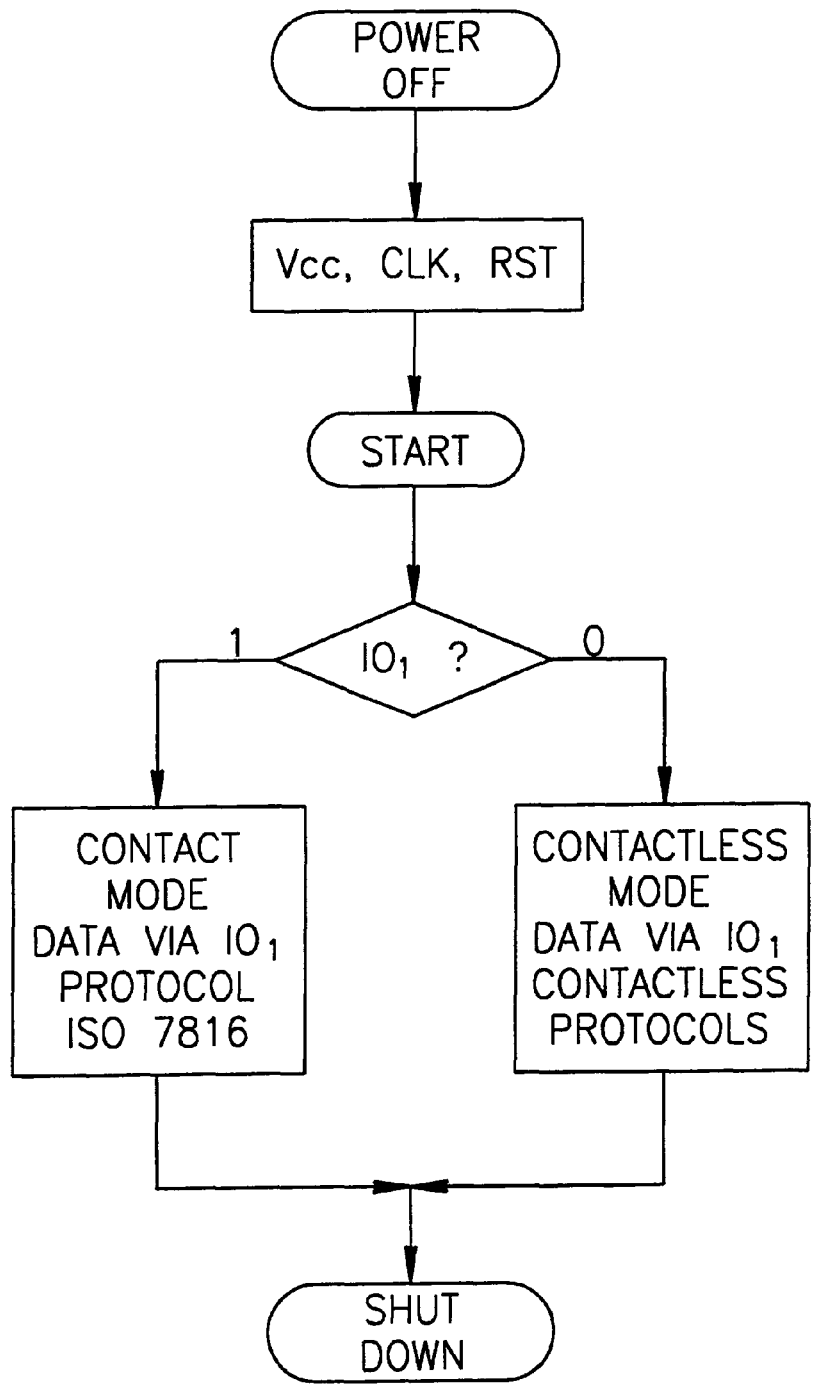
FIG. 15 is a flow diagram showing the principal operating steps on powering up a microprocessor having a single data I/O port.

FIG. 15 is a flow diagram summarizing the essential operating steps for use with a microprocessor having only a single data I/O port from an initial "power off" state. Operation of the microprocessor commences when all three of the Vcc, CLK and RST signals are fed thereto either via the appropriate contacts in the contact field 11 or, alternatively, via the antenna interface 16. Upon "power on", the single i/o data line $IO_1$ is sampled in order to determine the presence of an electromagnetic field corresponding to contactless mode or its absence corresponding to contact mode. In the case of contact mode, the microprocessor knows that both incoming and outgoing data are to be channeled via the i/o data line $IO_1$ in accordance with a communications protocol conforming to ISO 7816. In the case of contactless mode, the microprocessor knows that both incoming and outgoing data are to be channeled via the i/o data line $IO_1$ in accordance with a contactless protocol stored within the microprocessor.

Figure 16:
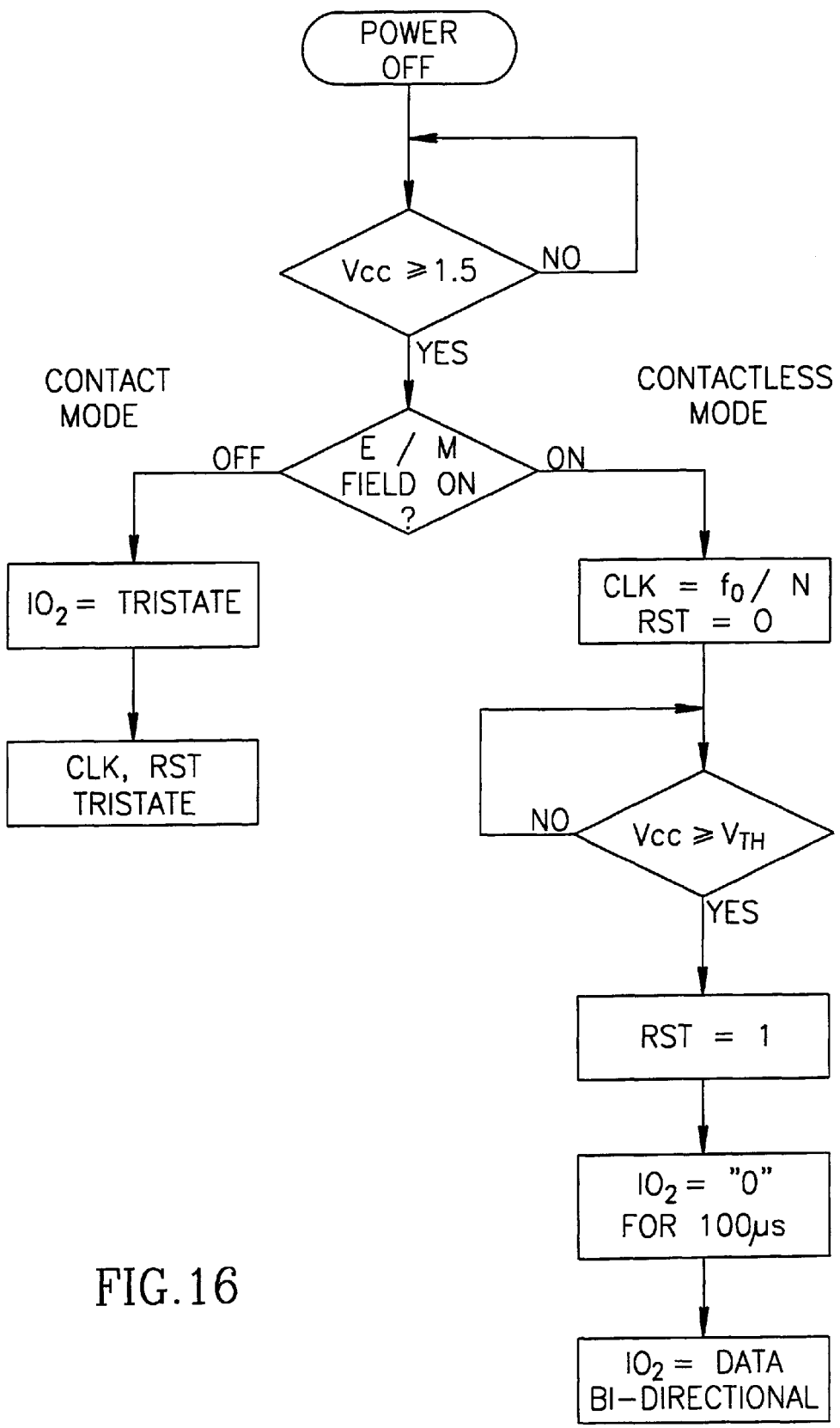
FIG. 16 is a flow diagram showing the principal operating steps associated with powering up the antenna interface when connected to a microprocessor having a single data I/O port.

FIG. 16 is a flow diagram showing the principal operating steps associated with the antenna interface 16 from an initial "power off" state when used with a microprocessor having only a single data I/O port. The value of the D.C. supply voltage Vcc output by the bridge rectifier 37 (shown in FIG. 1c) is constantly sampled and compared with a stored threshold, typically equal to 1.5V below which there is insufficient voltage to energize the circuitry within the antenna interface 16. When the voltage Vcc climbs above the minimum threshold, the mode detector 52 operates in order to establish whether contact or contactless mode is required. In contact mode, a flag $IO_2$ as well as the clock signal CLK and the reset signal RST are all set to "TRISTATE". On the other hand, in contactless mode, the reset signal RST is set to "0", (i.e. its active LOW level) and the clock output CLK is set to a frequency equal to $f_o/N$ where $f_o$ is the input frequency of the carrier signal typically equal to 13.56 MHz and N is a division factor stored in the EEPROM 53, typically equal to 3, 4, 6 or 8. By such means the clock frequency may be adjusted by the end user according to specific requirements.

Thereafter, the magnitude of the supply voltage Vcc is continually compared with a voltage threshold, $V_{TH}$ whose value is likewise stored in the EEPROM 53 such that when the supply voltage Vcc exceeds the voltage threshold, $V_{TH}$, the reset signal, RST, goes HIGH, logic "1". Immediately thereafter, the flag $IO_2$ is set to "0" for a short period of time e.g. 100 $\mu s$, whereafter it is set to the data fed thereto via the bi-directional data communications circuit 45.

When used in contact mode, the contact reader provides an external pull up resistor that sets the single microprocessor data port $IO_1$ to logic "1". Upon power-on reset, there exists a 100 $\mu s$ time period during which the data on the microprocessor's single data I/O port $IO_1$ allows determination as to whether the data thereon derives from the contact field (logic level "1") or from the antenna interface (logic level "0").

It will be understood that modifications may be effected without departing from the spirit of the invention. For example, in the preferred embodiment, data transfer is effected in contact mode using the ISO 7816 protocol, any other suitable protocol may be employed.

It will also be appreciated that, whilst the preferred embodiment has been described with reference to amplitude modulation of the carrier signal due to loading of the card, in practice such loading also gives rise to phase modulation of the carrier signal. Thus, the reader may also detect the change in phase of the carrier signal relative to its own master clock so as to improve the accuracy with which data is read from the card.

It should also be noted that, whilst in the preferred embodiment, the encoding means is implemented by means of an EEPROM, any other suitable means may be employed. For example, a DIP switch or fusible jumpers may be used in addition or instead.

It will be clear that the data card according to the invention differs over hitherto proposed data cards also in that, in the invention, data may be present on the contact field even when data is present on the coil antenna. In such a situation the microprocessor may be programmed to relate to the data on only one of the data lines or on both data lines simultaneously according to a predetermined protocol.

It will further be understood that whilst the invention has been described with particular reference to a data transaction device in the form of a card, any other suitable device is contemplated within the framework of the invention as defined in the appended claims. Likewise, such a device need not be a standalone module but may, if desired, be integrated with other hardware which may or may not be portable.

What is claimed is:

1. A data transaction device having a contactless mode of operation and comprising:

an antenna coil coupled to a processing unit via an antenna interface for allowing contactless data transmission between the data transaction device and a remote transceiver, and a circuit within the antenna interface including a variable loading means for modulating a signal transmitted by the remote transceiver and received by said antenna coil with outgoing data generated by the processing unit for transmitting via the antenna coil to the remote transceiver;

the variable loading means being connected in series with a load seen by the antenna coil and having a capacitance connected across said load so as to effect a change in impedance of the load seen by the antenna coil thus allowing amplitude and/or phase modulation of said signal without complete interruption thereof and regardless of the magnitude of an external capacitance connected across or forming part of said load.

2. The data transaction device according to claim 1, wherein said circuit further includes a demodulator for demodulating the signal so as to extract incoming data superimposed thereon by the remote transceiver using amplitude modulation having a low modulation index and regardless of the magnitude of an external capacitance connected across or forming part of said load.

3. The data transaction device according to claim 1, wherein the variable loading means includes a resistor having connected thereacross a switch whereby an impedance of the variable loading means varies from zero to the resistance of the resistor according to whether the switch is closed or open, said modulation being achieved by altering a status of the switch as a function of said outgoing data.

4. The data transaction device according to claim 3, wherein the demodulator includes:

(a) means for measuring the voltage across said resistor, and (b) means for determining the incoming data from changes in said measured voltage.

5. The data transaction device according to claim 1, wherein the variable loading means includes a non-linear element having connected thereacross a switch whereby an impedance of the variable loading means varies from zero to an effective impedance of the non-linear element according to whether the switch is closed or open, said modulation being achieved by altering a status of the switch as a function of said outgoing data.

6. The data transaction device according to claim 5, wherein the demodulator includes:

(a) means for syphoning off a small fixed fraction of the current flowing through the non-linear element, (b) means for measuring the current which is syphoned off, and (c) means for determining the incoming data from changes in said measured current.

7. The data transaction device according to claim 1, wherein the variable loading means includes a non-linear element having a selectable voltage or current relationship and being coupled to a selection means which is responsive to said outgoing data for selecting a corresponding voltage/current relationship whereby an impedance of the variable loading means may be varied as a function of said outgoing data.

8. The data transaction device according to claim 1, wherein said circuit further includes a modulator having a loading circuit coupled to the antenna coil for loading the antenna coil in response to said outgoing data fed to the loading circuit input by the processing unit.

9. The data transaction device according to claim 8, wherein the loading circuit is also used to effect over-voltage protection thus limiting the maximum voltage in the antenna interface produced by an electromagnetic field across the antenna coil.

10. The data transaction device according to claim 1, wherein said circuit further includes a demodulator for demodulating the signal so as to extract incoming data superimposed thereon by the remote transceiver using amplitude modulation having a high modulation index.

11. The data transaction device according to claim 1, wherein the capacitance across the load is divided across both sides of the variable loading means in such a proportion that a portion thereof remote from the load is sufficiently large to afford adequate smoothing of a high frequency ripple across said portion whilst being not too large as to interfere with the modulation and de-modulation of said signal.

12. The data transaction device according to claim 1, wherein said load includes a shunt component controlled by a shunt regulator so as to limit the voltage across the load to a desired level, thereby maintaining a desired voltage in the antenna interface produced by an electromagnetic field across the antenna coil below a predetermined over-voltage protection level regardless of the proximity of the data transaction device to the transceiver.

13. The data transaction device according to claim 12, wherein the antenna interface further includes integral customizing means for customizing and/or optimizing the antenna interface for a specific application, and the desired level of the shunt regulator is controlled by the customizing means.

14. In the data transaction device according to claim 13 and further including a protocol selection means for allowing operation of the data transaction device according to a selected data communications protocol, a method for modulating the signal with outgoing data comprising the steps of:

(a) providing an external capacitor across the load having a capacitance of sufficient magnitude to store enough residual energy to supply energy to the device during an absence of electromagnetic energy across the antenna coil, (b) setting the desired level of the voltage across the load close to a nominal high level, (c) adjusting an operating impedance of the variable loading means to a minimum, and (d) loading the antenna coil as required as a function of said data.

15. In the data transaction device according to claim 13 and further including a protocol selection means for allowing operation of the data transaction device according to a selected data communications protocol, a method for modulating the signal with outgoing data comprising the steps of:

(a) setting the desired level of the voltage across the load close to a nominal low level, (b) setting the variable loading means to a pre-determined non-zero impedance, and (c) effecting light loading of the antenna coil as required as a function of said outgoing data so that sufficient residual energy remains in the antenna coil for supplying energy to the data transaction device.

16. In the data transaction device according to claim 13 and further including a protocol selection means for allowing operation of the data transaction device according to a selected data communications protocol, a method for modulating the signal with outgoing data comprising the steps of:
   (a) providing an external capacitor across the load having a capacitance of sufficient magnitude to store enough residual energy to supply energy to the device during an absence of electromagnetic energy across the antenna coil,
   (b) setting the desired level of the voltage across the load close to a nominal high level,
   (c) adjusting an operating impedance of the variable loading means to a minimum, and
   (d) detecting an incoming signal across the antenna coil.

17. In the data transaction device according to claim 13 and further including a protocol selection means for allowing operation of the data transaction device according to a selected data communications protocol, a method for modulating the signal with outgoing data comprising the steps of:
   (a) setting the desired level of the voltage across the load close to a nominal low level,
   (b) setting the variable loading means to a pre-determined non-zero impedance, and
   (c) detecting an incoming signal by measuring the voltage across the variable loading means.

18. In the data transaction device according to claim 13 and further including a protocol selection means for allowing operation of the data transaction device according to a selected data communications protocol, a method for modulating the signal with outgoing data comprising the steps of:
   (a) setting the desired level of the voltage across the load close to a nominal low level,
   (b) setting the variable loading means to a pre-determined non-zero impedance, and
   (c) detecting an incoming signal by measuring the current through the variable loading means.

19. The data transaction device according to claim 1, further including a protocol selection means for allowing operation of the data transaction device according to a selected data communications protocol.

20. The data transaction device according to claim 19, wherein:
   the antenna interface further includes integral customizing means,
   and
   the protocol selector is responsive to said customizing means for selecting said data communications protocol.

21. The data transaction device according to claim 1, wherein the antenna interface further includes integral customizing means for customizing and/or optimizing the antenna interface for a specific application.

22. The data transaction device according to claim 1, further having a contact field for allowing a contact mode of operation, the antenna interface being inactive in said contact mode.

23. The data transaction device according to claim 22, wherein the antenna interface includes:
   a mode detector for sensing a presence or absence of an electromagnetic field across the antenna coil for producing respective contactless and contact mode signals,
   a reset circuit responsively coupled to the mode detector and being responsive to the contactless mode signal for feeding a reset signal RST to a reset port of the processing unit, and
   a clock circuit responsively coupled to the mode detector and being responsive to the contactless mode signal for feeding a clock signal CLK to a clock port of the processing unit.

24. The data transaction device according to claim 23, wherein:
   the processing unit has only a single data I/O port ($IO_1$),
   a data line of the contact field is adapted to feed a first logic level to the data I/O port of the processing unit when the data transaction device is inserted into a reader,
   when the antenna interface is inactive, a data line of the antenna interface is set to TRISTATE, and
   when the antenna interface is active, a data line of the antenna interface is set initially to the first logic level and then to a second logic level opposite to the first logic level for an initial brief time period prior to be set to actual data to be read by the processing unit;
   thereby allowing the processing unit to determine whether incoming data derives from the contact field or from the antenna interface according to a logic level of the data line during said initial brief time period.

25. The data transaction device according to claim 1, wherein the processing unit and the antenna interface are integrated on a single chip.

* * * * *